(12) United States Patent
Furukawa et al.

(10) Patent No.: US 10,890,269 B2
(45) Date of Patent: Jan. 12, 2021

(54) VALVE APPARATUS

(71) Applicant: DENSO CORPORATION, Kariya (JP)

(72) Inventors: Takashi Furukawa, Kariya (JP); Toshihisa Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 81 days.

(21) Appl. No.: 16/041,986

(22) Filed: Jul. 23, 2018

(65) Prior Publication Data

US 2019/0032808 A1     Jan. 31, 2019

(30) Foreign Application Priority Data

| Jul. 28, 2017 | (JP) | 2017-146335 |
| Apr. 20, 2018 | (JP) | 2018-081206 |
| May 16, 2018 | (JP) | 2018-094378 |
| May 18, 2018 | (JP) | 2018-096076 |

(51) Int. Cl.
  *F16K 31/06*   (2006.01)
  *F02M 63/00*   (2006.01)
  *F02M 51/06*   (2006.01)
  *F02D 41/20*   (2006.01)
  *F02M 21/02*   (2006.01)

(52) U.S. Cl.
  CPC ............ *F16K 31/06* (2013.01); *F02D 41/20* (2013.01); *F02M 21/0254* (2013.01); *F02M 21/0266* (2013.01); *F02M 21/0278* (2013.01); *F02M 51/0614* (2013.01); *F02M 51/0678* (2013.01); *F02M 63/0061* (2013.01); *F02M 2200/08* (2013.01); *F02M 2200/306* (2013.01); *F02M 2200/46* (2013.01); *F02M 2200/9015* (2013.01); *F02M 2200/9038* (2013.01)

(58) Field of Classification Search
  CPC ............ F16K 31/0655; F02M 21/0254; F02M 21/026; F02M 21/0266; F02M 63/0061; F02M 63/0068; F02M 2200/08; F02M 22/46
  USPC ........................................ 251/129.15, 129.21
  See application file for complete search history.

(56) References Cited

U.S. PATENT DOCUMENTS

| 4,647,008 A * | 3/1987 | Shirai | F16K 31/0655 |
| | | | 251/129.07 |
| 5,125,432 A * | 6/1992 | Fujii | B60T 8/3645 |
| | | | 137/596.17 |

(Continued)

FOREIGN PATENT DOCUMENTS

JP      2007-100643 A    4/2007

*Primary Examiner* — Seth W. Mackay-Smith
(74) *Attorney, Agent, or Firm* — Oliff PLC

(57) ABSTRACT

In a valve apparatus, a housing includes a plurality of through holes through which a fluid flows. A first valve member opens and closes a first through hole. A second valve member opens and closes at least one second through hole. A fixed core does not move relative to the housing. A coil forms magnetic field. A first movable core moves integrally with the first valve member. When the coil forms the magnetic field, a magnetic attractive force is generated between the first movable core and the fixed core. A second movable core moves integrally with the second valve member. When the coil forms the magnetic field, a magnetic attractive force is generated between the second movable core and the fixed core. A magnetic constriction portion is provided between the fixed core and the first movable core. The second through hole is opened after the first through hole is opened.

21 Claims, 29 Drawing Sheets

(56) References Cited

U.S. PATENT DOCUMENTS

| | | | | |
|---|---|---|---|---|
| 6,026,860 | A * | 2/2000 | Teichmann | F16K 31/06 |
| | | | | 137/870 |
| 7,347,221 | B2 * | 3/2008 | Berger | F16K 31/0655 |
| | | | | 137/628 |
| 8,297,714 | B2 * | 10/2012 | Bensch | B60T 8/362 |
| | | | | 303/34 |
| 8,794,718 | B2 * | 8/2014 | Bensch | B60T 8/362 |
| | | | | 137/596.1 |
| 9,151,222 | B2 * | 10/2015 | Svensson | F02B 75/021 |
| 10,472,218 | B2 * | 11/2019 | Auer | B67C 3/286 |
| 2004/0238053 | A1 * | 12/2004 | Baarda | F16K 31/082 |
| | | | | 137/869 |
| 2011/0168931 | A1 * | 7/2011 | Sugiura | F16K 1/443 |
| | | | | 251/129.15 |
| 2016/0305570 | A1 * | 10/2016 | Meisiek | F02M 63/0022 |
| 2017/0016417 | A1 * | 1/2017 | Fujino | F02M 21/026 |

* cited by examiner

VALVE APPARATUS

CROSS-REFERENCE TO RELATED APPLICATION

This application is based on and claims the benefit of priority from Japanese Patent Application Nos. 2017-146335, filed Jul. 28, 2017, 2018-081206, filed Apr. 20, 2018, 2018-094378, filed May 16, 2018, and 2018-096076, filed May 18, 2018. The entire disclosures of the above applications are incorporated herein by reference.

BACKGROUND

Technical Field

The present disclosure relates to a valve apparatus.

Related Art

Conventionally, a fuel injection valve that controls driving of a plurality of valve members is known. The fuel injection valve widens a range of an injection amount of fuel that can be injected by selectively injecting fuel from a plurality of injection holes. For example, JP-A-2007-100643 describes a fuel injection valve that includes an inner valve member and an outer valve member. The inner valve member opens and closes an inner injection hole. The outer valve member is provided on an outer side of the inner valve member in a radial direction, and opens and closes an outer injection hole. The outer injection hole is formed on an outer side of a center injection hole.

However, the fuel injection valve described in JP-A-2007-100643 includes a first driving unit and a second driving unit. The first driving unit drives the inner valve member. The second driving unit drives the outer valve member. Therefore, the fuel injection valve has a complicated configuration and is also large in physical size.

SUMMARY

It is thus desired to provide a valve apparatus that can be made smaller in physical size, while widening a range of a flow amount of a fluid that can be distributed.

An exemplary embodiment of the present disclosure is a valve apparatus that includes a housing, a first valve member, a second valve member, a fixed core, a coil, a control unit, a first movable core, a second movable core, and a magnetic constriction portion. The first valve member is provided so as to move relative to the housing. The housing includes a plurality of through holes through which a fluid flows. The first valve member opens and closes a first through hole that is at least one or more of the plurality of through holes.

The second valve member is provided so as to move relative to the housing. The second valve member opens and closes at least one second through hole of the plurality of through holes excluding the at least one or more through hole.

The fixed core is provided so as to move relative to the housing. The coil forms a magnetic field by being energized. The control unit controls energization of the coil. The first movable core is provided so as to move integrally with the first valve member.

When the coil generates the magnetic field, a magnetic attractive force is generated between the first movable core and the fixed core. The second movable core is provided so as to move integrally with the second valve member. When the coil generates the magnetic field, a magnetic attractive force is generated between the second movable core and the fixed core.

The magnetic constriction portion is provided between the fixed core and the first movable core. The valve apparatus of the exemplary embodiment opens the second through hole after opening the first through hole.

In the valve apparatus of the present disclosure, when the magnetic field is formed as a result of the coil being energized, the first valve member moves as a result of the magnetic attractive force between the first movable core and the fixed core, between which the magnetic constriction portion is provided. The first through hole is thereby opened. Subsequently, when an energization amount of the coil is increased, magnetic flux density in the magnetic constriction portion provided between the fixed core and the first movable core becomes saturated. As a result, the magnetic attractive force between the second movable core and the fixed core increases. Therefore, the second valve member moves, and the second through hole is opened.

In this manner, in the valve apparatus of the exemplary embodiment, opening and closing of the first through hole and opening and closing of the second through hole can be controlled through control of the energization of the coil. Therefore, a plurality of drive sources that respectively drive a plurality of valve members is not required. Consequently, the valve apparatus of the exemplary embodiment can be made smaller in physical size by a simple configuration, while widening a range of a flow amount of a fluid that can be distributed, as a result of the plurality of through holes being provided.

In addition, the control unit provided in the valve apparatus of the exemplary embodiment controls the energization of the coil such that the second through hole is intermittently opened in a state in which the first through hole is continuously open. In addition, the control unit controls the energization of the coil such that, after the second through hole is opened after the first through hole is opened, the first through hole is closed while the second through hole remains open. Consequently, the valve apparatus of the exemplary embodiment can inject a fluid in multiple amounts within the range of the amount of fluid that can be injected.

DESCRIPTION OF THE EMBODIMENTS

A plurality of embodiments will hereinafter be described with reference to the drawings. According to the plurality of embodiments, a section that is essentially identical to that according to another embodiment is given the same reference number. A description thereof is omitted.

First Embodiment

A fuel injection valve 1 that serves as a valve apparatus according to a first embodiment will be described with reference to FIG. 1 to FIG. 7. The fuel injection valve 1 is applied to an engine system 10 shown in FIG. 2.

Figure 2:
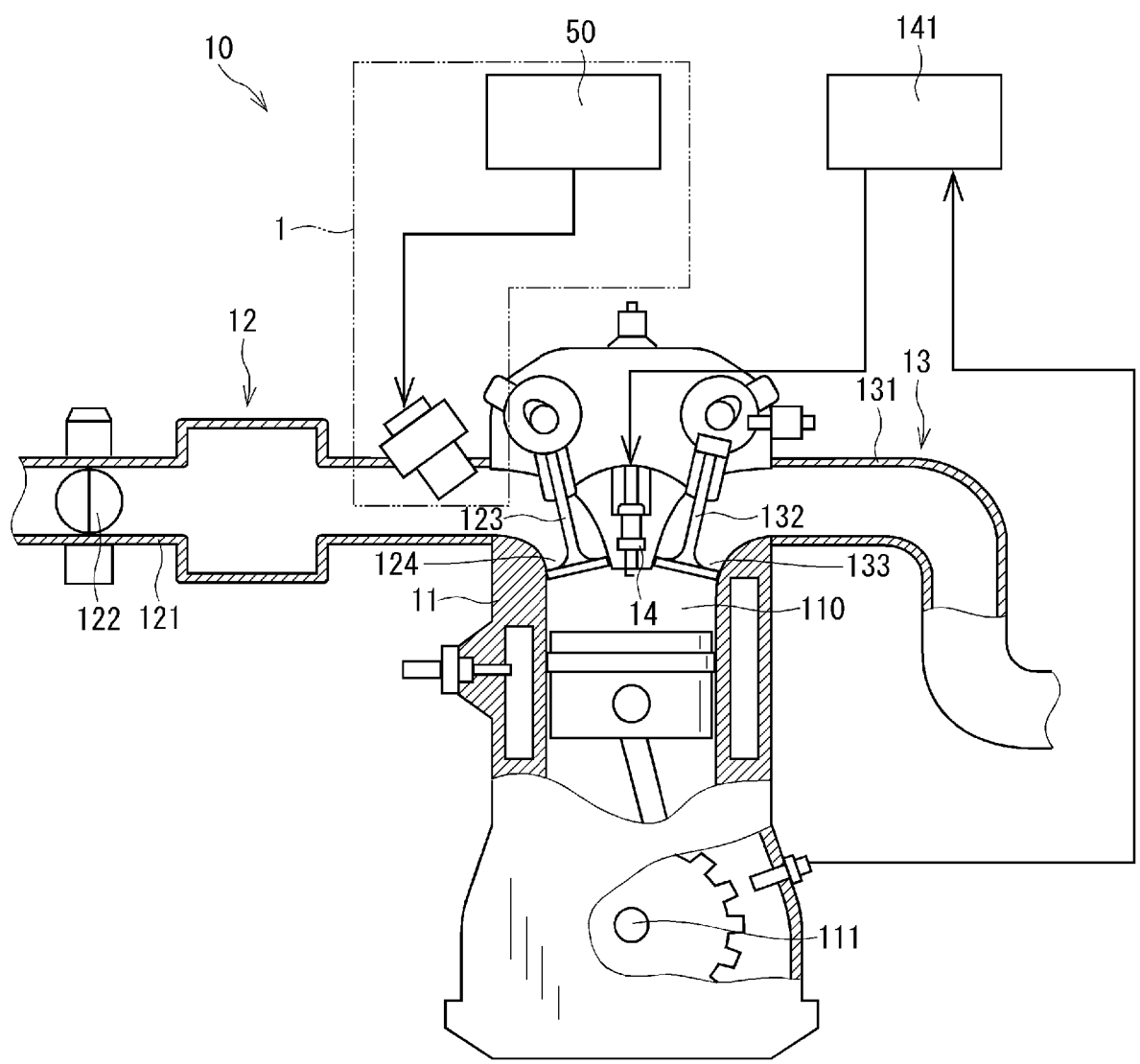
FIG. 2 is a schematic diagram of an engine system to which the valve apparatus according to the first embodiment is applied.

First, a configuration of the engine system 10 will be described with reference to FIG. 2. For example, the engine system 10 includes a four-stroke engine 11. The engine system 10 generates rotational torque by burning fuel gas in a combustion chamber 110. The fuel gas serves as a fluid that is injected from the fuel injection valve 1. As shown in FIG. 2, the engine system 10 includes the engine 11, an intake system 12, the fuel injection valve 1, an exhaust system 13, a spark plug 14, and the like.

The intake system 12 includes an intake manifold 121, a throttle valve 122, and an intake valve 123. The throttle valve 122 is provided in the intake manifold 121. The throttle valve 122 is capable adjusting an amount of air that is supplied to the combustion chamber 110 of the engine 11. The fuel injection valve 1 is provided in the intake manifold 121. The fuel gas that is injected from the fuel injection valve 1 is led into the combustion chamber 110 together with air that flows through the intake manifold 121. An intake port 124 is provided in a section in which the intake manifold 121 and the engine 11 are connected. The intake port 124 communicates between the interior of the intake manifold 121 and the combustion chamber 110. The intake valve 123 opens and closes the intake port 124.

The exhaust system 13 includes an exhaust manifold 131 and an exhaust valve 132. An exhaust port 133 is provided in a section in which the exhaust manifold 131 and the engine 11 are connected. The exhaust port 133 communicates between the interior of the exhaust manifold 131 and the combustion chamber 110. The exhaust valve 132 opens and closes the exhaust port 133.

The spark plug 14 generates a spark that can ignite an air-fuel mixture of the fuel gas and air that are led into the combustion chamber 110. The spark plug 14 is electrically connected to an ignition control unit 141. The ignition control unit 141 controls an ignition timing of the spark plug based on information on apparatuses mounted in the engine 11, such as a rotation angle of a crank shaft 111 of the engine 11.

Next, a detailed configuration of the fuel injection valve 1 will be described with reference to FIG. 1. The fuel injection valve 1 includes a housing 20, an inner valve member 25, an outer valve member 35, a fixed core 40, a magnetic constriction portion 41, a shock absorbing member 42, a coil 45, a control unit 50, an inner movable core 55, an outer movable core 65, a first spring 71, and a second spring 72. The inner valve member 25 serves as a first valve member. The outer valve member 35 serves as a second valve member. The shock absorbing member 42 serves as a non-magnetic portion. The inner movable core 55 serves as a first movable core. The outer movable core 65 serves as a second movable core.

Figure 1:
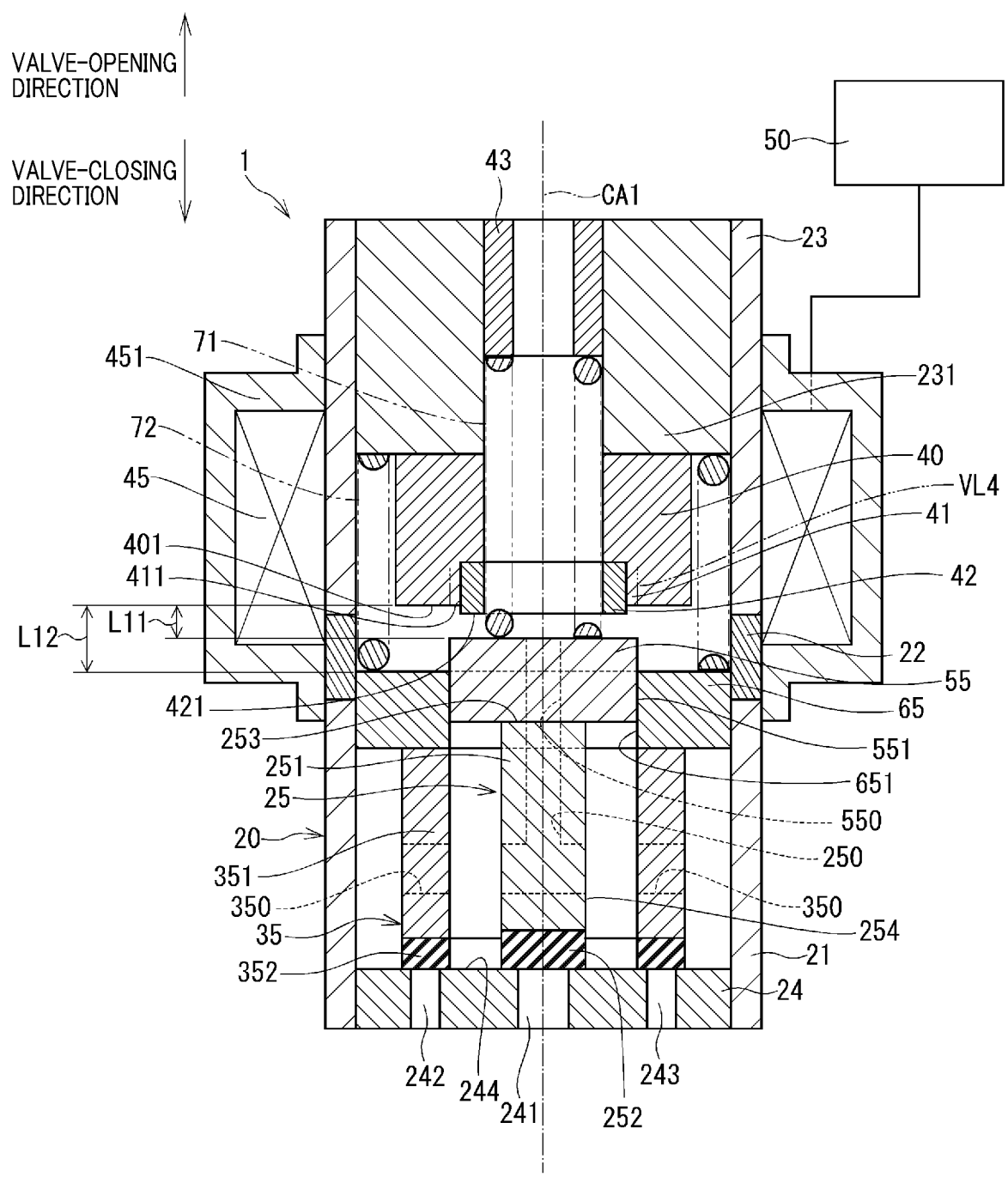
FIG. 1 is a cross-sectional view of a valve apparatus according to a first embodiment.

In FIG. 1, a direction in which the inner valve member 25 and the outer valve member 35 move so as to come into contact with an injection portion 24 of the housing 20 is a valve-closing direction. A direction in which the inner valve member 25 and the outer valve member 35 move away from the injection portion 24 of the housing 20 is a valve-opening direction. The injection portion 24 serves as a through-hole forming portion.

The housing 20 includes a first cylinder portion 21, a second cylinder portion 22, a third cylinder portion 23, and the injection portion 24. The first cylinder portion 21 is a cylindrical section that is open on both ends. The first cylinder portion 21 is made of a magnetic material. The second cylinder portion 22 is provided in an edge portion formed by one opening of the first cylinder portion 21. The second cylinder portion 22 is a cylindrical section that is open on both ends. The second cylinder portion 22 is made of a non-magnetic material. The third cylinder portion 23 is provided on an opposite side of the second cylinder portion 22 from the first cylinder portion 21. The third cylinder portion 23 is a cylindrical section that is open on both ends. The third cylinder portion 23 is made of a magnetic material. The first cylinder portion 21, the second cylinder portion 22, and the third cylinder portion 23 are arranged such that center axes thereof are coaxial.

The injection portion 24 is a substantially circular section that is provided on an opposite side of the first cylinder portion 21 from the second cylinder portion 22. The injection portion 24 has a plurality of injection holes through which fuel gas flows. Among the plurality of injection holes, an injection hole that is positioned on a center axis CA1 of the fuel injection valve 1 is referred to as an inner injection hole 241. The inner injection hole 241 serves as a first through hole. In addition, among the plurality of injection holes, injection holes that are formed in directions away from the center axis CA1 when viewed from the inner injection hole 241 are referred to as outer injection holes 242 and 243. The outer injection holes 242 and 243 serve as at least one second through hole. According to the first embodiment, the inner injection hole 241 is formed such that a cross-sectional area thereof is smaller than a total cross-sectional area of the outer injection holes 242 and 243.

The inner valve member 25 is a substantially rod-shaped member. The inner valve member 25 includes a shaft portion 251 and a seal portion 252. The inner valve member 25 is provided so as to move relative to the housing 20.

The shaft portion 251 is a rod-shaped section. The shaft portion 251 has a passage 250 that opens onto an end surface 253 and a side surface 254. The end surface 253 is on the valve-opening direction side of the shaft portion 251. The side surface 254 is on an outer side of the shaft portion 251 in a radial direction, near the seal portion 252.

The seal portion 252 is provided on the valve-closing direction side of the shaft portion 251. The seal portion 252 is formed integrally with the shaft portion 251. The seal portion 252 is made of a material that has elasticity, such as rubber. The seal portion 252 is formed so as to seal the opening of the inner injection hole 241 on the first cylinder portion 21 side when the seal portion 252 comes into contact with an end surface 244 of the injection portion 24 on the first cylinder portion 21 side. The inner valve member 25 is thereby capable of opening and closing the inner injection hole 241.

The outer valve member 35 is a substantially cylindrical member. The outer valve member 35 includes a cylinder portion 351 and a seal portion 352. The outer valve member 35 is provided so as to move relative to the housing 20.

The cylinder portion 351 is a cylindrical section that is provided in an outer radial direction from the shaft portion 251. The cylinder portion 351 has a passage 350 that communicates between an inner side of the cylinder portion 351 in the radial direction and an outer side of the cylinder portion 351 in the radial direction. The passage 350 is formed so as to pass through the cylinder portion 351 in the radial direction in a plurality of sections of the cylinder portion 351.

The seal portion 352 is provided on the valve-closing direction side of the cylinder portion 351. The seal portion 352 is formed integrally with the cylinder portion 351. The seal portion 352 is formed into an annular shape from a material that has elasticity, such as rubber. The seal portion 352 is formed so as to seal the openings of the outer injection holes 242 and 243 on the first cylinder portion 21 side when the seal portion 352 comes into contact with the end surface 244 of the injection portion 24. The outer valve member 35 is thereby capable of opening and closing the outer injection holes 242 and 243.

The fixed core 40 is provided on the inner side of the third cylinder portion 23 in the radial direction, in such a manner that the fixed core 40 does not move relative to the housing 20. According to the first embodiment, the fixed core 40 is formed into a cylindrical shape. An end portion of the fixed core 40 on the valve-opening direction side is supported by a cylindrical fixing member 231. The fixing member 231 is fixed to the inner side of the third cylinder portion 23 in the radial direction.

The magnetic constriction portion 41 is provided in a position that is on the valve-closing direction side of the fixed core 40 and opposes the inner movable core 55, described hereafter. The magnetic constriction portion 41 is formed into an annular shape. According to the first embodiment, the magnetic constriction portion 41 is formed integrally with the fixed core 40. The magnetic constriction portion 41 is formed such that an inner diameter thereof is larger than an inner diameter of the fixed core 40.

In a cross-sectional view shown in FIG. 1, a border between the fixed core 40 and the magnetic constriction portion 41 is indicated by a two-dot chain line VL4. In FIG. 1, the two-dot chain line VL4 overlaps a virtual line formed when a cross-sectional line indicating a side surface 551 of the inner movable core 55 on the outer side in the radial direction is extended in the valve-opening direction.

The shock absorbing member 42 is provided on the inner side of the magnetic constriction portion 41 in the radial direction. The shock absorbing member 42 is made of a non-magnetic material that has a relatively high degree of hardness. An end surface 421 of the shock absorbing member 42 on the valve-closing direction side is positioned further towards the injection portion 24 than an end surface 411 of the magnetic constriction portion 41 on the valve-closing direction side. The end surface 411 serves as an end surface of a magnetic constriction portion that opposes a first movable core. The end surface 421 of the shock absorbing material 42 comes into contact with the inner movable core 55.

The coil 45 is provided on the outer side of the housing 20 in the radial direction. Specifically, the coil 45 is fixed by a coil holding member 451 in such a manner that the coil 45 does not move relative to the housing 20. The coil holding member 451 is made of a magnetic material. The coil 45 is electrically connected to the control unit 50. The coil 45 forms a magnetic field as a result of being energized.

The control unit 50 is configured by a microcomputer made of a central processing unit (CPU), a read-only memory (ROM), a random access memory (RAM), an input/output port, and the like. The control unit 50 controls the magnitude of a current that is supplied to the coil 45, based on information that is inputted from an external source.

The inner movable core 55 is provided on the valve-opening direction side of the inner valve member 25, so as to move integrally with the inner valve member 25. The inner movable core 55 is formed into a substantially circular disk shape from a magnetic material. The inner movable core 55 is formed such that an outer diameter thereof is larger than an outer diameter of the shaft portion 251. When the coil 45 generates a magnetic field, a magnetic attractive force is generated between the inner movable core 55 and the fixed core 40. The inner movable core 55 has a passage 550 that communicates between the valve-opening direction side and the valve-closing direction side of the inner movable core 55. The passage 550 communicates to the passage 250 in the shaft portion 251.

The outer movable core 65 is provided on the valve-opening direction side of the outer valve member 35, so as to move integrally with the outer valve member 35. The outer movable core 65 is formed into a substantially circular annular shape from a magnetic material. The outer movable core 65 is formed such that an outer diameter thereof is larger than an outer diameter of the cylinder portion 351. In addition, the outer movable core 65 is formed such that an inner diameter thereof is of a size identical to or slightly larger than the outer diameter of the inner movable core 55.

For example, an abrasion-resistance treatment, such as soft nitriding treatment, is performed on a side surface 651 of the outer movable core 65 on the inner side in the radial direction and a side surface 551 of the inner movable core 55 that slides with the side surface 651. When the coil 45 forms the magnetic field, a magnetic attractive force is generated between the outer movable core 65 and the fixed core 40.

In the fuel injection valve 1, the area of the end surface 411 of the magnetic constriction portion 41 that opposes the inner movable core 55 is smaller than the area of an end surface 401 of the fixed core 40 on the valve-closing direction side that opposes the outer movable core 65. The end surface 401 serves as an end surface of a fixed core that opposes a second movable core. In addition, as shown in FIG. 1, in the fuel injection valve 1, when the inner valve member 25 and the outer valve member 35 are in contact with the end surface 244 of the injection portion 24, a distance L11 between the inner movable core 55 and the end surface 411 of the magnetic constriction portion 41 is shorter than a distance L12 between the outer movable core 65 and the end surface 401 of the fixed core 40.

The first spring 71 is provided in an inner radial direction from the fixed core 40 and an inner radial direction from the fixing member 231. One end of the first spring 71 is in contact with an end surface of the inner movable core 55 on the valve-opening direction side. The other end of the first spring 71 is connected to an adjusting pipe 43 that is provided on the inner side of the fixing member 231 in the radial direction. The first spring 71 urges the inner valve member 25 together with the inner movable core 55 such that the seal portion 252 comes into contact with the end surface 244 of the injection portion 24.

The second spring 72 is provided in an outer radial direction from the fixed core 40. One end of the second spring 72 is in contact with the valve-opening direction side of the outer movable core 65. The other end of the second spring 72 is in contact with an end surface of the fixing member 231 in the valve-closing direction side. The second spring 72 urges the outer valve member 35 together with the outer movable core 65 such that the seal portion 352 comes into contact with the end surface 244 of the injection portion 24.

Next, workings of the fuel injection valve 1 will be described with reference to FIG. 1, FIG. 3, and FIG. 4.

When a current is not flowing to the coil 45, the fuel injection valve 1 is in the state shown in FIG. 1. Specifically, the seal portion 252 of the inner valve member 25 and the seal portion 352 of the outer valve member 35 are in contact with the end surface 244 of the injection portion 24. Therefore, the inner injection hole 241 and the outer injection holes 242 and 243 are closed. The fuel gas flows into the housing 20 through the inner side of the adjusting pipe 43. The fuel gas then flows towards the inner side of the first cylinder portion 21 in the radial direction, by passing through the passage 550 of the inner movable core 55, the passage 250 of the shaft portion 251, and the passage 350 of the cylinder portion 351.

When a current flows to the coil 45, a magnetic circuit is formed in the periphery of the coil 45. FIG. 3 schematically shows the magnetic circuit formed in the periphery of the coil 45.

Figure 3:
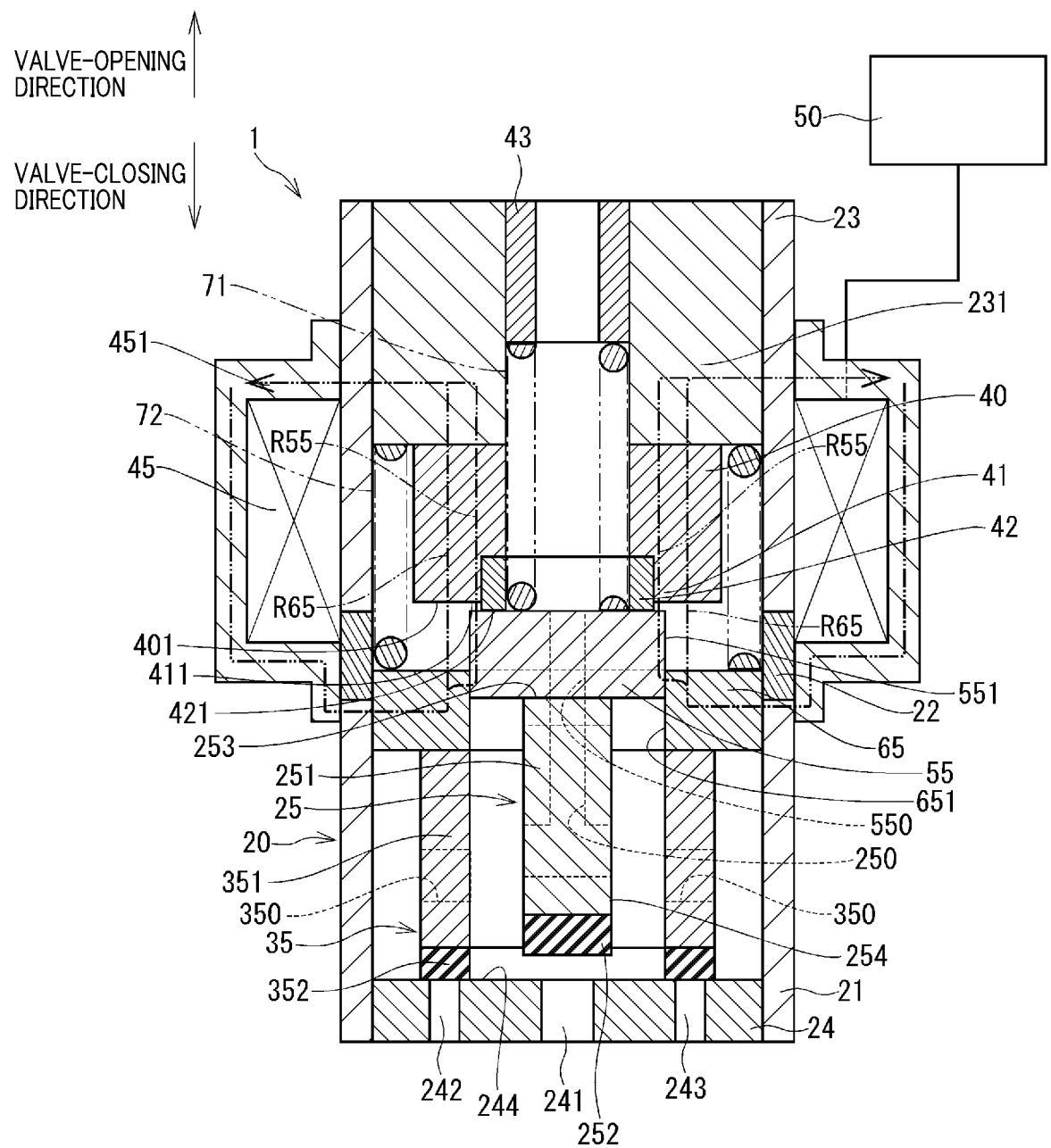
FIG. 3 is a cross-sectional view for explaining workings of the valve apparatus according to the first embodiment, the state thereof differing from that in FIG. 1.
Figure 4:
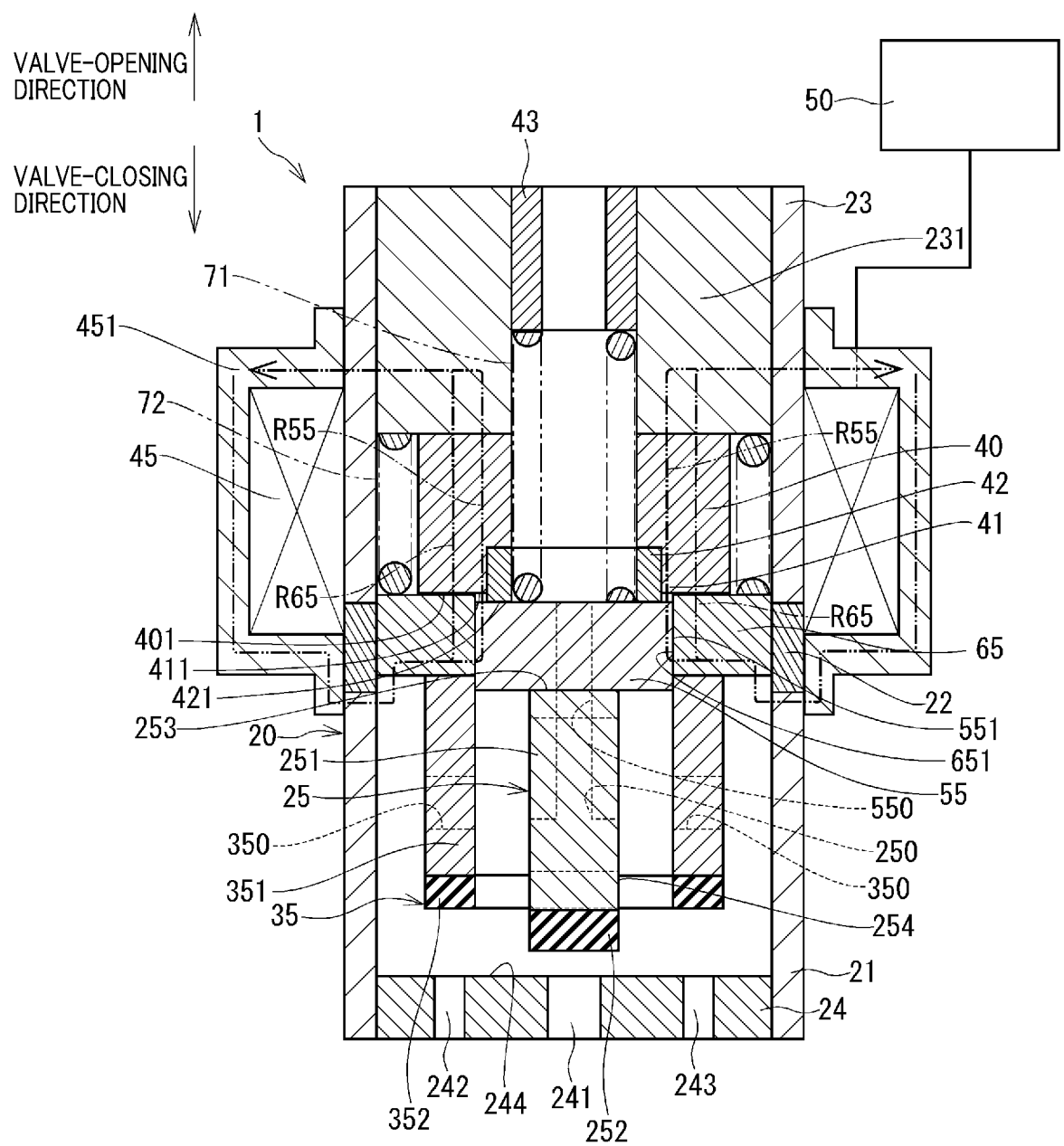
FIG. 4 is a cross-sectional view for explaining the workings of the valve apparatus according to the first embodiment, the state thereof differing from those in FIG. 1 and FIG. 3.

As shown in FIG. 3, two paths, that is, a path R65 and a path R55 are formed in the magnetic circuit. The path R65 runs from the coil holding member 451 and the first cylinder portion 21 to the outer movable core 65, the magnetic constriction portion 41, the fixed core 40, the fixing member 231, and the third cylinder portion 23. The path R55 runs from the coil holding member 451 and the first cylinder portion 21 to the outer movable core 65, the inner movable core 55, the magnetic constriction portion 41, the fixed core 40, the fixing member 231, and the third cylinder portion 23.

Of the two paths, the magnetic circuit is mainly formed on the path R55 when the current starts to flow to the coil 45, because the distance L11 between the magnetic constriction portion 41 and the inner movable core 55 on the path 55 is shorter than the distance L12 between the outer movable core 65 and the end surface 401 of the fixed core 40 on the path R65. As a result, the magnetic attractive force is generated between the fixed core 40 and the inner movable core 55.

Therefore, the inner movable core 55 moves in the valve-opening direction together with the inner valve member 25. The seal portion 252 separates from the end surface 244. When the seal portion 252 separates from the end surface 244, the inner injection hole 241 is opened. When the inner injection hole 241 is opened, the fuel gas inside the first cylinder portion 21 is injected from the inner injection hole 241. As shown in FIG. 3, the inner movable core 55 and the inner valve member 25 move in the valve-opening direction until the inner movable core 55 comes into contact with the shock absorbing member 42.

When the current further flows to the coil 45, magnetic flux density of the path R55 becomes saturated because the area of the magnetic constriction portion 41 that opposes the inner movable core 55 is relatively small. As a result, the magnetic circuit on the path R65 becomes more easily formed. The magnetic attractive force that moves the outer movable core 65 and the outer valve member 35 is generated between the fixed core 40 and the outer movable core 65.

When the magnetic attractive force is generated between the fixed core 40 and the outer movable core 65, the outer movable core 65 moves in the direction towards the fixed core 40 together with the outer valve member 35. As shown in FIG. 4, the seal portion 352 separates from the end surface 244. When the seal portion 352 separates from the end surface 244, the outer injection holes 242 and 243 are opened. When the outer injection holes 242 and 243 are opened, the fuel gas inside the first cylinder portion 21 is injected from the outer injection holes 242 and 243.

Figure 5:
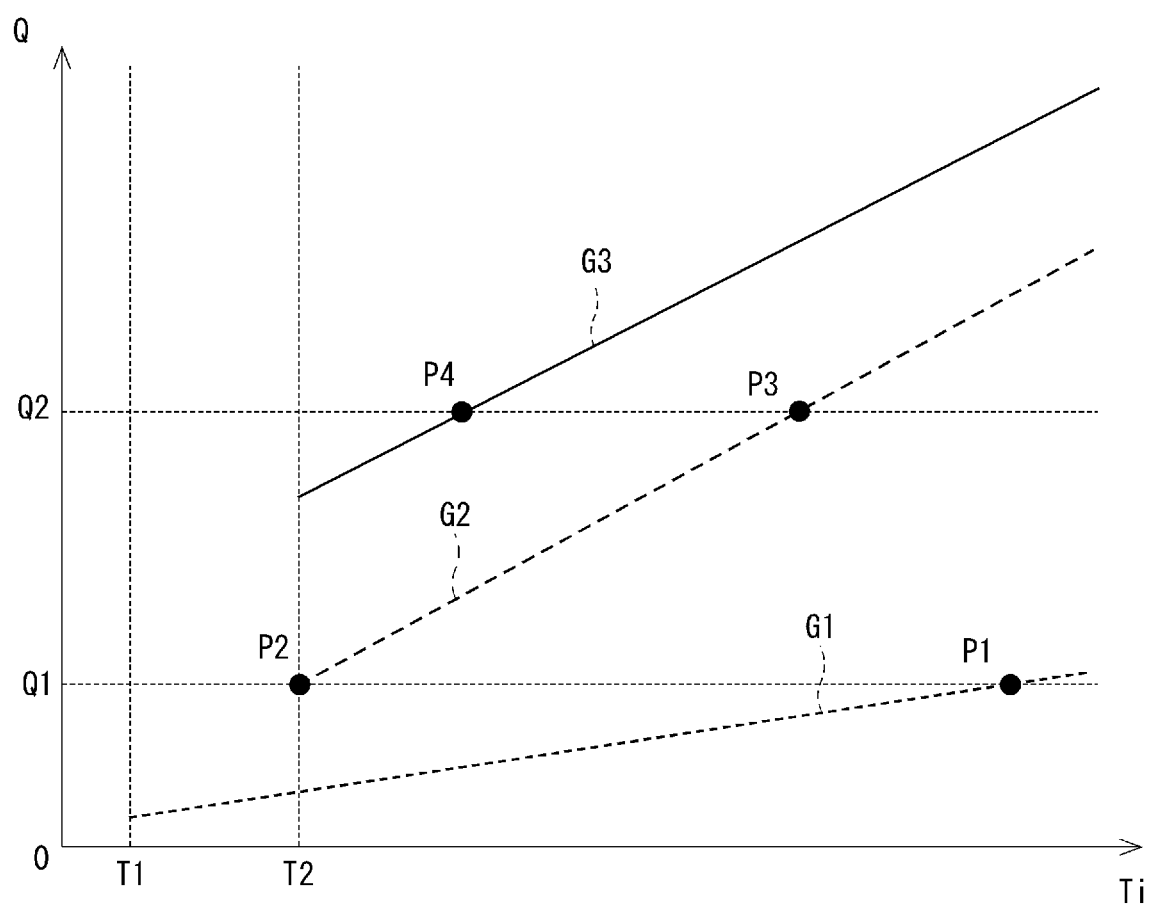
FIG. 5 is a characteristics diagram for explaining a relationship between a pulse width of a current and an injection amount in the valve apparatus according to the first embodiment.

Next, injection control performed in the fuel injection valve 1 will be described with reference to FIG. 5 to FIG. 7. FIG. 5 shows a relationship between a pulse width of a current controlled by the control unit 50 and an injection amount of fuel gas. In FIG. 5, a pulse width Ti of the current is indicated on a horizontal axis. An injection amount Q of the fuel gas is indicated on a vertical axis. FIG. 5 shows three energization modes based on the magnitude of the magnetic attractive force generated between the inner movable core 55 and the fixed core 40, and between the outer movable core 65 and the fixed core 40.

In FIG. 5, an energization mode for generating a magnetic attractive force from a magnitude of zero to a magnitude of an extent that enables the inner movable core 55 to move is indicated by a dashed line G1. In addition, an energization mode for generating a magnetic attractive force from a magnitude of zero to a magnitude of an extent that enables the outer movable core 65 to move is indicated by a long dashed line G2. Furthermore, an energization mode for generating a magnetic attractive force from a magnitude of an extent that enables the inner movable core 55 to move to a magnitude of an extent that enables the outer movable core 65 to move is indicated by a solid line G3.

In FIG. 5, a minimum value of the pulse width of the current at which the inner movable core 55 moves is indicated by a pulse width T1. That is, to reliably move the inner movable core 55, a current that has a pulse width equal to or greater than the pulse width T1 is required. In addition, a minimum value of the pulse width of the current at which the outer movable core 65 moves is indicated by a pulse width T2. That is, to reliably move the outer movable core 65, a current that has a pulse width equal to or greater than the pulse width T2 is required.

Figure 6:
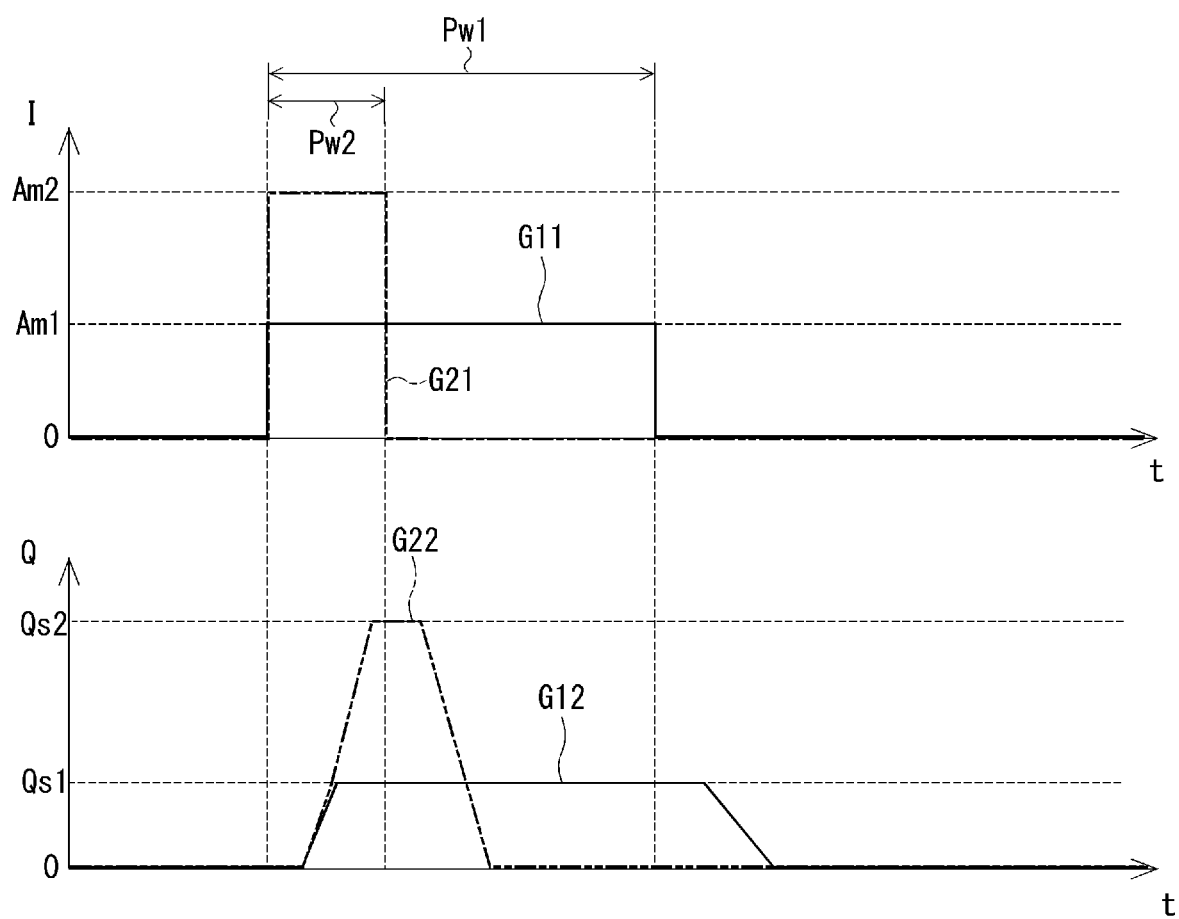
FIG. 6 is a characteristics diagram of changes over time in characteristics of the valve apparatus according to the first embodiment.
Figure 7:
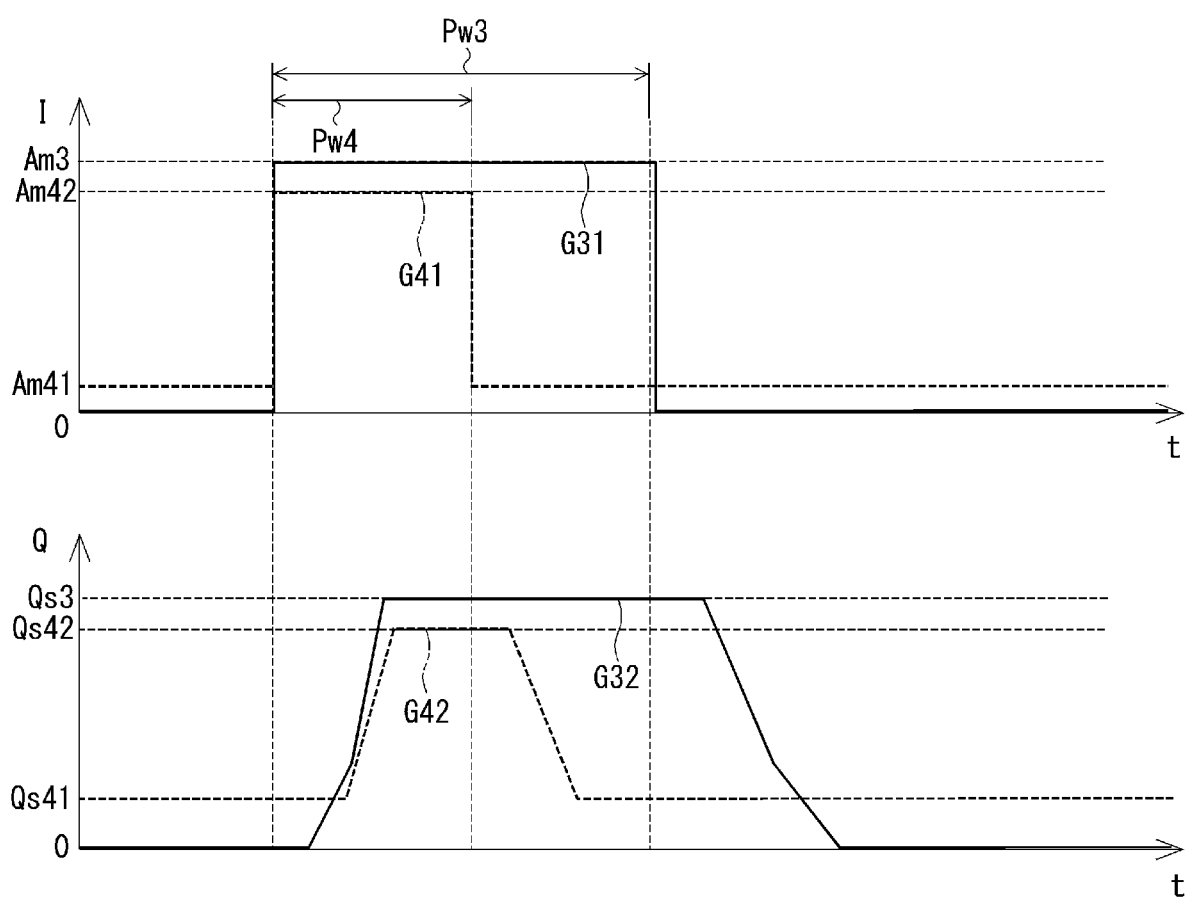
FIG. 7 is a characteristics diagram of changes over time in the characteristics of the valve apparatus according to the first embodiment, the state thereof differing from that in FIG. 6.

FIG. 6 and FIG. 7 show comparisons of characteristics during some of the control process shown in the characteristics diagram in FIG. 5. Here, FIG. 6 and FIG. 7 show the characteristics during a single injection operation of the fuel gas.

FIG. 6 shows a comparison of control P1 and control P2 in FIG. 5. A total injection amount of fuel gas by injection control during the control P1 and a total injection amount of fuel gas by injection control during the control P2 are a same injection amount Q1.

In the control P1, the control unit 50 sends a current that has a maximum current value of Am1 to the coil 45 at a pulse width Pw1 (solid line G11 in FIG. 6). The fuel injection amount per unit time at this time is an injection amount Qs1, at maximum (solid line G12 in FIG. 6). Meanwhile, when the coil 45 is energized by a current that has a maximum current value Am2 that is greater than the maximum current value Am1 at a pulse width Pw2 that is shorter than the pulse width Pw1 (dotted line G21 in FIG. 6), the fuel injection amount per unit time is an injection amount Qs2, at maximum (dotted line G22 in FIG. 6).

When the control P1 and the control P2 are compared, the control P1 injects the fuel gas over a longer amount of time than the control P2. As a result, the injection of fuel gas by the control P1 has a smaller pressure pulsation than the injection of fuel gas by the control P2.

FIG. 7 shows a comparison between control P3 and control P4 in FIG. 5. A total injection amount of fuel gas by injection control during the control P3 and a total injection amount of fuel gas by injection control during the control P3 are a same injection amount Q2.

In the control P3, the control unit 50 sends a current that has a maximum current value of Am3 to the coil 45 at a pulse width Pw3 (solid line G31 in FIG. 7). The fuel injection amount per unit time at this time is an injection amount Qs3, at maximum (solid line G32 in FIG. 7). Meanwhile, in the control P4, the control unit 50 sends a current that has a current value of Am41 to the coil 45 to enable the state in which the inner valve member 25 is continuously separated from the end surface 244 to be maintained (dotted line G41 in FIG. 7). As a result, the fuel injection amount per unit time becomes an injection amount Qs41 (dotted line G42 in FIG. 7).

Furthermore, a current that has a current value Am42 that is less than the maximum current value Am3 is sent to the coil 45 at a pulse width Pw4 that is shorter than the pulse width Pw3 (dotted line G41 in FIG. 7). As a result, the fuel injection amount per unit time is an injection amount Qs42, at maximum (dotted line G42 in FIG. 7). The injection amount Qs42 is less than the injection amount Qs3.

When the control P3 and the control P4 are compared, the control P4 injects a smaller amount of fuel gas over a longer amount of time than the control P3. As a result, the injection of fuel gas by the control P4 has a smaller pressure pulsation than the injection of fuel gas by the control P3.

(a) In the fuel injection valve 1 according to the first embodiment, a magnetic field is generated as a result of energization of the coil 45. Then, the magnetic attractive force is generated between the inner movable core 55 and the fixed core 40, between which the magnetic constriction portion 41 is provided. The inner valve member 25 moves as a result of the magnetic attractive force, and the inner injection hole 241 is opened.

Subsequently, when the amount of energization of the coil 45 is increased, the magnetic flux density in the magnetic constriction portion 41 that is provided between the fixed core 40 and the movable core 55 becomes saturated. As a result, the magnetic attractive force between the outer movable core 65 and the fixed core 40 increases. Therefore, the outer valve member 35 moves, and the outer injection holes 242 and 243 are opened.

In this manner, in the fuel injection valve 1, opening and closing of the inner injection hole 241 and opening and closing of the outer injection holes 242 and 243 can be controlled through control of the energization of the coil 45. Therefore, a plurality of drive sources that respectively drive a plurality of valve members is not required. Consequently, the fuel injection valve 1 can be made smaller in physical size by a simple configuration, while widening the range of the injection amount over which fuel can be injected, as a result of the inner injection hole 241 and the outer injection holes 242 and 243 being provided.

(b) In the fuel injection valve 1, the distance L11 between the magnetic constriction portion 41 and the inner movable core 55 is shorter than the distance L12 between the outer movable core 65 and the end surface 401 of the fixed core 40. Therefore, in the fuel injection valve 1, the inner movable core 55 and the inner valve member 25 can be moved in the valve-opening direction before the outer movable core 65 and the outer valve member 35 when the coil 45 is energized.

In addition, in the fuel injection valve 1, the area of the magnetic constriction portion 41 that opposes the inner movable core 55 is smaller than the area of the magnetic constriction portion 41 that opposes the outer movable core 65. Therefore, the magnetic flux density between the inner movable core 55 and the magnetic constriction portion 41 is easily saturated. As a result, in the fuel injection valve 1, the outer movable core 65 and the outer valve member 35 can move in the valve-opening direction after the inner movable core 55 and the inner valve member 25 moves in the valve-opening direction.

(c) The magnetic constriction portion 41 is provided with the shock absorbing member 42 on the inner side in the radial direction that is the side opposing the inner movable core 55. The shock absorbing member 42 is made of a non-magnetic material. Therefore, the area of the magnetic constriction portion 41 that opposes the inner movable core 55 is further reduced. The magnetic flux density is more easily saturated. As a result, in the fuel injection valve 1, the outer movable core 65 and the outer valve member 35 can reliably move in the valve-opening direction, after the inner movable core 55 and the inner valve member 25 move in the valve-opening direction.

(d) In addition, in the fuel injection valve 1, the inner valve member 25 and the outer valve member 35 can be separately driven by the current to the single coil 45 being controlled. Therefore, a plurality of drive sources that respectively drive a plurality of valve members is not required. Consequently, manufacturing cost of the fuel injection valve 1 can be reduced.

(e) In general, fuel gas and air do not easily mix. Therefore, combustion efficiency of an engine that burns fuel gas to output rotational torque tends to be low. In the fuel injection valve 1 according to the first embodiment, as shown in FIG. 5, the pressure pulsation of the fuel gas injected from the fuel injection valve 1 can be controlled as a result of the control unit 50 controlling the current value and the pulse width of the current that is sent to the coil 45.

In particular, as in the control P4 in FIG. 5, when the fuel gas that is intermittently injected from the outer injection holes 242 and 243 at a predetermined interval is combined with the fuel gas that is continuously injected from the inner injection hole 241, airflow is agitated. Mixing of the fuel gas and the air is promoted. Consequently, the fuel injection valve 1 controls the combustion state of fuel gas in the engine 11.

(f) The fuel injection valve 1 according to the first embodiment includes the inner injection hole 241 and the outer injection holes 242 and 243. The inner injection hole 241 is positioned on the center axis CA1. The outer injection holes 242 and 243 are formed in directions away from the center axis CA1 when viewed from the inner injection hole 241. Therefore, the inner valve member 25 that opens and closes the inner injection hole 241 and the outer valve member 35 that opens and closes the outer injection holes 242 and 243 can be coaxially moved. Consequently, the fuel injection valve 1 has favorable workability. Manufacturing cost can be further reduced, while reducing physical size.

(g) In the fuel injection valve according to the first embodiment, the inner injection hole 241 is formed such that the cross-sectional area thereof is smaller than the total cross-sectional area of the outer injection holes 242 and 243. Therefore, when only the inner injection hole 241 is opened, a small flow of fuel gas can be injected. When both the inner injection hole 241 and the outer injection holes 242 and 243 are opened, a large flow of fuel gas can be injected. Consequently, the fuel injection valve 1 can further widen the range of the amount of fuel gas that can be injected.

Second Embodiment

Next, a valve apparatus according to a second embodiment will be described with reference to FIG. 8. The second embodiment differs from the first embodiment in that the shock absorbing member is not provided in the magnetic constriction portion.

A fuel injection valve 2 according to the second embodiment includes the housing 20, the inner valve member 25, the outer valve member 35, the fixed core 40, a magnetic constriction portion 81, the coil 45, the control unit 50, the inner movable core 55, the outer movable core 65, the first spring 71, and the second spring 72.

The magnetic constriction portion 81 is provided on the valve-closing direction side of the fixed core 40. The magnetic constriction portion 81 is formed into an annular shape. The magnetic constriction portion 81 is formed such that an inner diameter thereof is larger than the inner diameter of the fixed core 40. A space 82 is provided on the inner side of the magnetic constriction portion 81 in the radial direction, in a position opposing the inner movable core 55.

Figure 8:
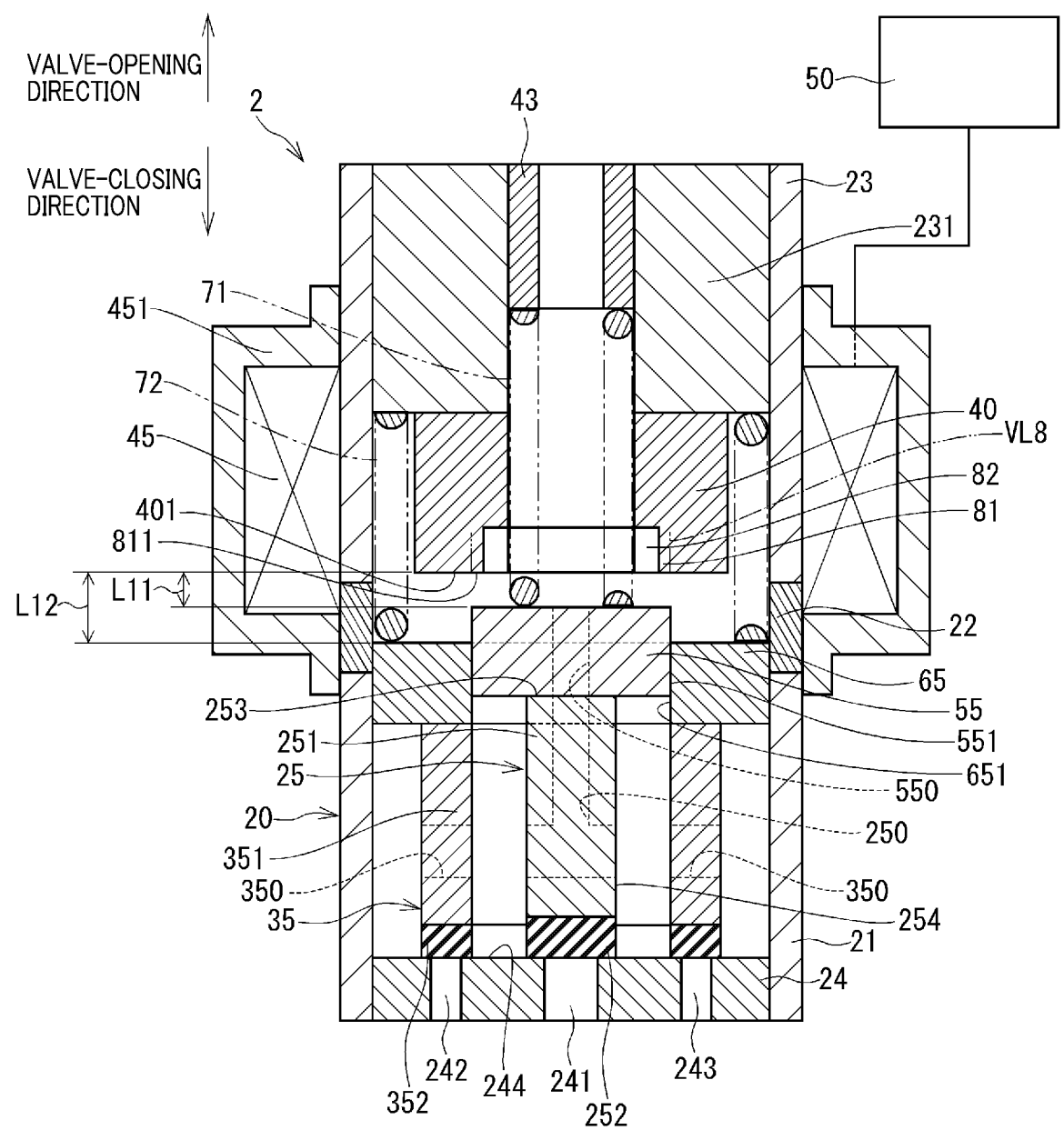
FIG. 8 is a cross-sectional view of a valve apparatus according to a second embodiment.

In a cross-sectional view shown in FIG. 8, a border between the fixed core 40 and the magnetic constriction portion 81 is indicated by a two-dot chain line VL8. In FIG. 8, the two-dot chain line VL8 overlaps a virtual line formed when a cross-sectional line indicating the side surface 551 of the inner movable core 55 on the outer side in the radial direction is extended in the valve-opening direction.

In the fuel injection valve 2, an area of an end surface 811 of the magnetic constriction portion 81 on the valve-closing direction side that opposes the inner movable core 55 is smaller than the area of the end surface 401 of the fixed core 40 that opposes the outer movable core 65.

In the fuel injection valve 2 according to the second embodiment, the magnetic constriction portion 81 is provided with the space 82 that is positioned between the fixed core 40 and the inner movable core 55. As a result, the area of the magnetic constriction portion 81 that opposes the inner movable core 55 is smaller than the area of the magnetic constriction portion 81 that opposes the outer movable core 65. Therefore, the magnetic flux density in the magnetic constriction portion 81 between the fixed core 40 and the inner movable core 55 becomes easily saturated. Consequently, the second embodiment can obtain the same effects as the first embodiment.

Third Embodiment

Next a valve apparatus according to a third embodiment will be described with reference to FIG. 9 to FIG. 12. The third embodiment differs from the first embodiment in terms of the shape of the inner valve member and the shape of the outer valve member. The third embodiment also differs from the first embodiment in that a third urging member is provided.

A fuel injection valve 3 according to the third embodiment includes the housing 20, an inner valve member 26, an outer valve member 36, the fixed core 40, the magnetic constriction portion 41, the coil 45, the control unit 50, the inner movable core 55, the outer movable core 65, the first spring 71, the second spring 72, and a third spring 73. The inner valve member 26 serves as a first valve member. The outer valve member 36 serves as a second valve member. The third spring 73 serves as an urging member.

The inner valve member 26 is a substantially rod-shaped member. The inner valve member 26 includes the shaft portion 251, the seal portion 252, and an inner protruding portion 263. The inner valve member 26 is provided so as to move relative to the housing 20. The inner valve member 26 opens and closes the inner injection hole 241.

Figure 10:
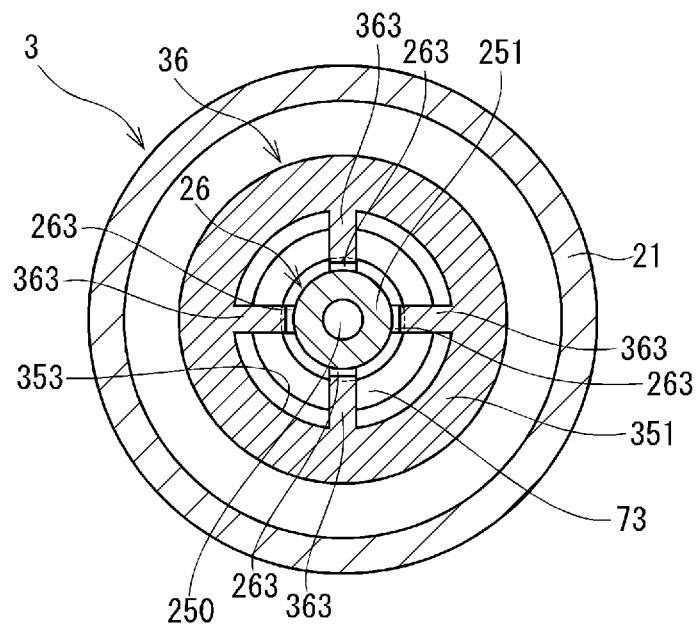
FIG. 10 is a cross-sectional view taken along line X-X in FIG. 9.

The inner protruding portion 263 is provided on the side surface 254 of the shaft portion 251 on the outer side in the radial direction. The inner protruding portion 263 is formed so as to protrude in an outer radial direction from the side surface 254. According to the present embodiment, as shown in FIG. 10, four inner protruding portions 263 are formed at an even interval on the outer side of the shaft portion 251 in the radial direction.

The outer valve member 36 is a substantially cylindrical member. The outer valve member 36 includes the cylinder portion 351, the seal portion 352, and an outer protruding portion 363. The outer valve member 36 is provided so as to move relative to the housing 20. The outer valve member 36 opens and closes the outer injection holes 242 and 243.

Figure 9:
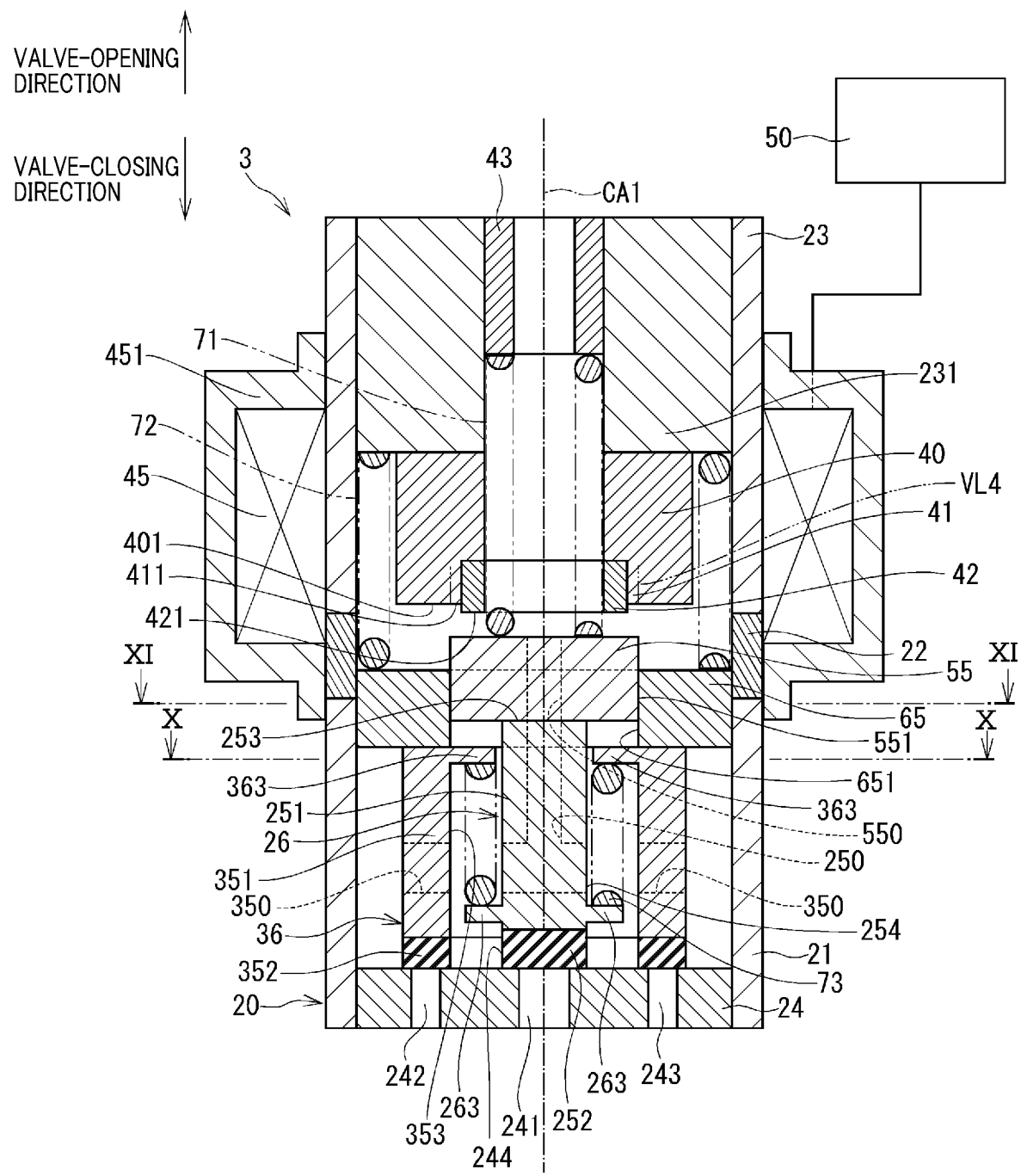
FIG. 9 is a cross-sectional view of a valve apparatus according to a third embodiment.

The outer protruding portion 363 is provided on a side surface 353 of the cylinder portion 351 on the inner side in the radial direction. As shown in FIG. 10, the outer protruding portion 363 is formed so as to protrude in the inner radial direction from the side surface 353. As shown in FIG. 9, the outer protruding portion 363 is provided in a position farther away from the injection portion 24 than the inner protruding portions 263. According to the present embodiment, as shown in FIG. 10, four outer protruding portions 363 are formed at an even interval on the inner side of the cylinder portion 351 in the radial direction.

The third spring 73 is provided between the inner protruding portion 263 and the outer protruding portion 363. The third spring 73 urges the inner protruding portion 263 and the outer protruding portion 363 such that the inner protruding portion 263 and the outer protruding portion 363 separate from each other.

Figure 11:
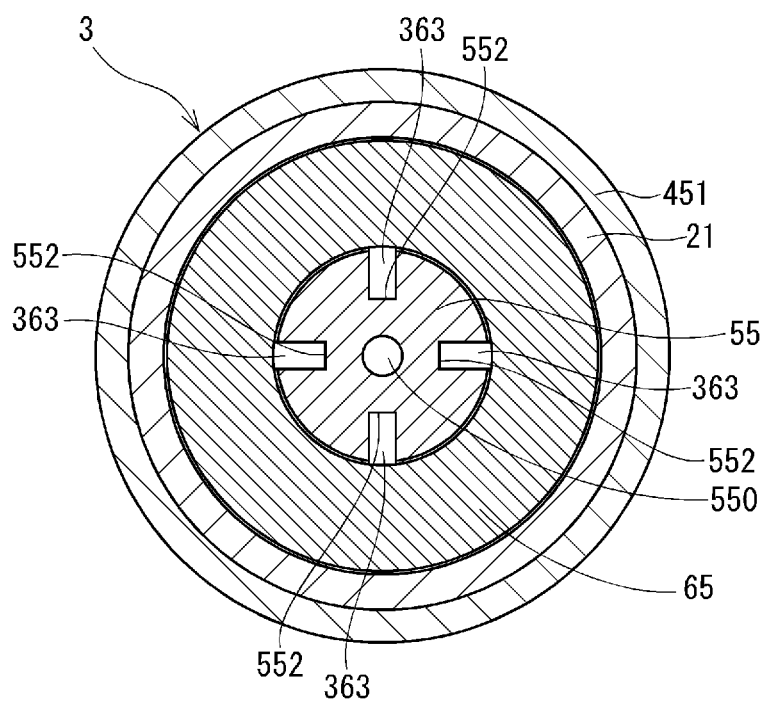
FIG. 11 is a cross-sectional view taken along line XI-XI in FIG. 9.

As shown in FIG. 11, the inner movable core 55 provided in the fuel injection valve 3 has four grooves 552 in a peripheral edge portion thereof. The four grooves 552 are formed so as to pass through the inner movable core 55 in a direction along the center axis CA1. The four grooves 552 are of a size allowing passage of the outer protruding portions 363.

According to the present embodiment, when the fuel injection valve 3 is assembled, the inner valve member 26, the inner movable core 55, and the third spring 73 are inserted into the housing from the third cylinder portion 23 side. Then, the outer valve member 36 and the outer movable core 65 are inserted into the housing 20 from the third cylinder portion 23 side. When the outer valve member 36 and the outer movable core 65 are inserted into the housing 20, the outer protruding portions 363 pass through the grooves 552.

In addition, as another assembly method, the outer valve member 36 and the outer movable core 65 are inserted into the housing 20 from the first cylinder portion 21 side. Then, the inner valve member 26, the inner movable core 55, and the third spring 73 are inserted into the housing 20 from the first cylinder portion 21 side. When the inner valve member 26, the inner movable core 55, and the third spring 73 are inserted into the housing 20, the outer protruding portion 363 passes through the grooves 552. As a result, the inner valve member 26 and the outer valve member 36 are provided in the positions shown in FIG. 9.

Next, workings of the fuel injection valve 3 will be described with reference to FIG. 9 and FIG. 12. When a current is not flowing to the coil 45, the fuel injection valve 3 is in the state shown in FIG. 9. When a current flows to the coil 45 and the magnetic circuit is formed in the periphery of the coil 45, the magnetic attractive force is generated between the inner movable core 55 and the fixed core 40. When the magnetic attractive force increases to a certain extent, the inner movable core 55 and the inner valve member 26 move in the valve-opening direction. As a result, as shown in FIG. 12, the seal portion 252 separates from the end surface 244 and the inner injection hole 241 is opened.

Figure 12:
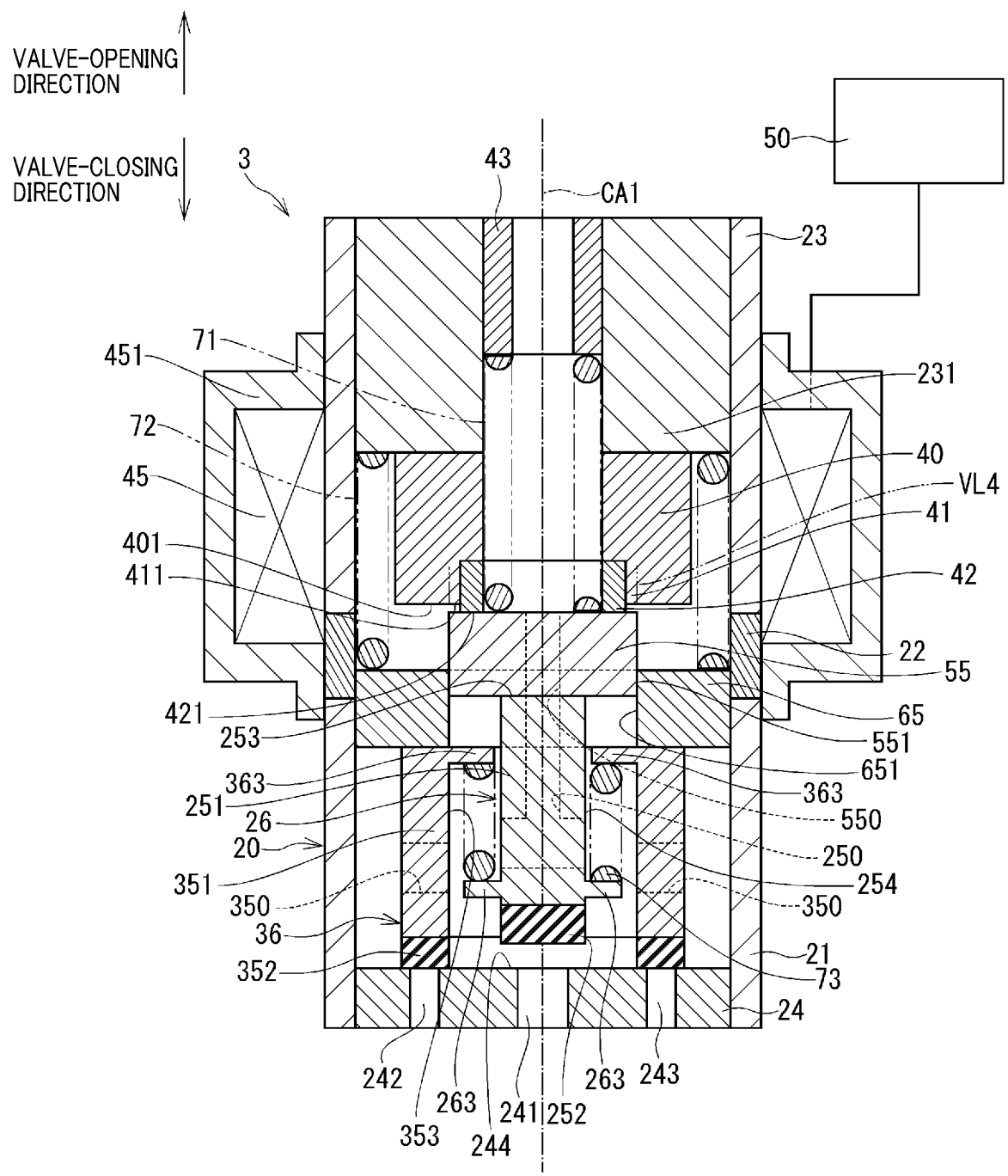
FIG. 12 is a cross-sectional view of the valve apparatus according to the third embodiment, the state thereof differing from that in FIG. 9.

When the inner valve member 26 moves in the valve-opening direction, the distance between the inner protruding portion 263 and the outer protruding portion 363 becomes shorter than that in a valve-closed state (see FIG. 12). When the distance between the inner protruding portion 263 and the outer protruding portion 363 becomes shorter, the third spring 73 is compressed. As a result, the outer valve member 36 is urged in the valve-opening direction with stronger force than in the state shown in FIG. 9, as a result of the compressed third spring 73.

When the current is further sent to the coil 45, the magnetic flux density between the fixed core 40 and the inner movable core 55 becomes saturated. The magnetic attractive force is generated between the fixed core 40 and the outer movable core 65. When the magnetic attractive force between the fixed core 40 and the outer movable core 65 increases to a certain extent, the outer movable core 65 and the outer valve member 36 move in the valve-opening direction. When the outer valve member 36 moves in the valve-opening direction, the seal portion 352 separates from the end surface 244. The outer injection holes 242 and 243 are opened.

In the fuel injection valve 3 according to the third embodiment, opening and closing of the inner injection hole 241 and the opening and closing of the outer injection holes 242 and 243 can be controlled through control of the energization of the coil 45. As a result, the third embodiment can obtain the same effects as the first embodiment.

The fuel injection valve 3 according to the third embodiment includes the third spring 73 that urges the inner valve member 26 in the valve-closing direction and urges the outer valve member 36 in the valve-opening direction. As a result, when the inner injection hole 241 is closed, the inner valve member 26 is urged in the valve-closing direction by the urging force of the third spring 73. Therefore, liquid-tightness of the inner injection hole 241 can be reliably maintained. In addition, when the inner valve member 26 moves in the valve-opening direction, the inner valve member 26 moves at a lower speed than that according to the first embodiment as a result of the urging force of the third spring 73.

As a result, impact that occurs when the inner movable core 55 that moves together with the inner valve member 26 collides with the shock absorbing member 42 can be reduced. Consequently, according to the third embodiment, impact noise caused by the collision between the inner movable core 55 and the shock absorbing member 42 can be reduced while preventing damage resulting from the collision between the inner movable core 55 and the shock absorbing member 42.

In the fuel injection valve 3 according to the third embodiment, when the inner injection hole 241 is open, the urging force from the third spring 73 in the valve-opening direction acts on the outer valve member 36. Therefore, the outer injection holes 242 and 243 open with relative ease. As a result, according to the third embodiment, the magnetic attractive force required to move the outer valve member 36 in the valve-opening direction can be reduced from that according to the first embodiment. Therefore, the physical size of the coil 45 can be reduced. In addition, according to the third embodiment, because the magnetic attractive force required to move the outer valve member 36 in the valve-opening direction can be reduced, responsiveness regarding opening of the outer injection holes 242 and 243 can be improved.

Furthermore, in the fuel injection valve 3 according to the third embodiment, in cases in which the coil 45 is identical to that according to the first embodiment, an amount of lift of the outer valve member 36 can be increased through use of the urging force of the third spring 73. Consequently, the range of the injection amount of fuel gas that can be injected from the fuel injection valve 3 can be widened.

Fourth Embodiment

Figure 13:
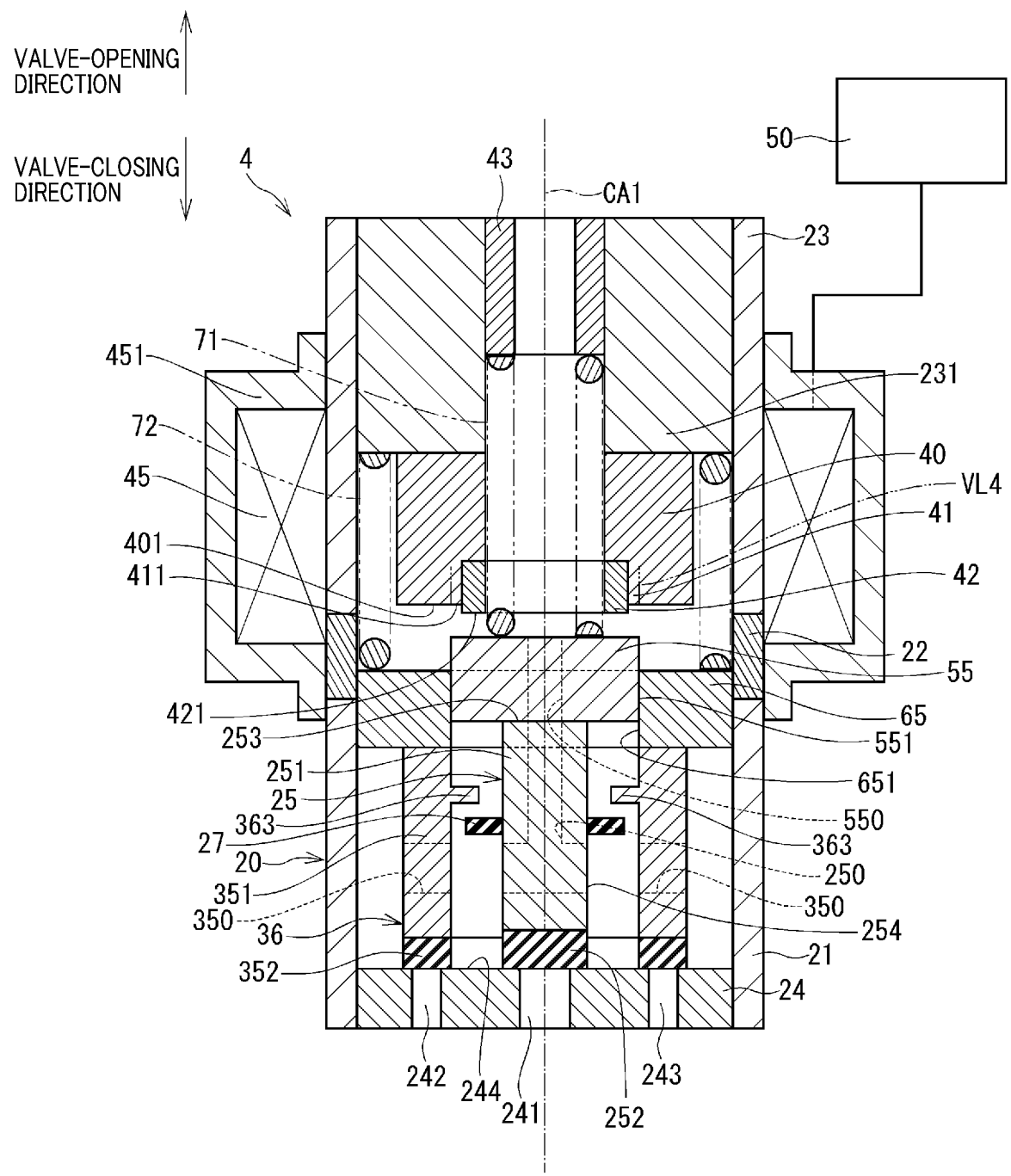
FIG. 13 is a cross-sectional view of a valve apparatus according a fourth embodiment.

Next, a valve apparatus according to a fourth embodiment will be described with reference to FIG. 13 and FIG. 14. The fourth embodiment differs from the first embodiment in that the inner valve member is provided with an elastic member. The fourth embodiment also differs from the first embodiment in terms of the shape of the outer valve member. A fuel injection valve 4 according to the fourth embodiment includes the housing 20, the inner valve member 25, an elastic member 27, the outer valve member 36, the fixed core 40, the magnetic constriction portion 41, the coil 45, the control unit 50, the inner movable core 55, the outer movable core 65, the first spring 71 and the second spring 72. The inner valve member 25 serves as either of a first valve member and a second valve member. The outer valve member 36 serves as the other of the first valve member and the second valve member.

The elastic member 27 is provided on the side surface 254 of the shaft portion 251 on the outer side in the radial direction. The elastic member 27 is formed so as to protrude in the outer radial direction from the side surface 254. The elastic member 27 is integrated with the inner valve member 25 and moves relative to the housing 20. The elastic member 27 is made of an elastic material. When the inner injection hole 241 is opened, the elastic member 27 engages with the outer protruding portion 363 that is provided in the outer valve member 36.

Next, workings of the fuel injection valve 4 will be described with reference to FIG. 13 and FIG. 14. When a current is not flowing to the coil 45, the fuel injection valve 4 is in the state shown in FIG. 13. When the magnetic field is formed in the periphery of the coil 45 and the magnetic attractive force between the inner movable core 55 and the fixed core 40 increases to a certain extent, the seal portion 252 separates from the end surface 244. The inner injection hole 241 is opened.

Figure 14:
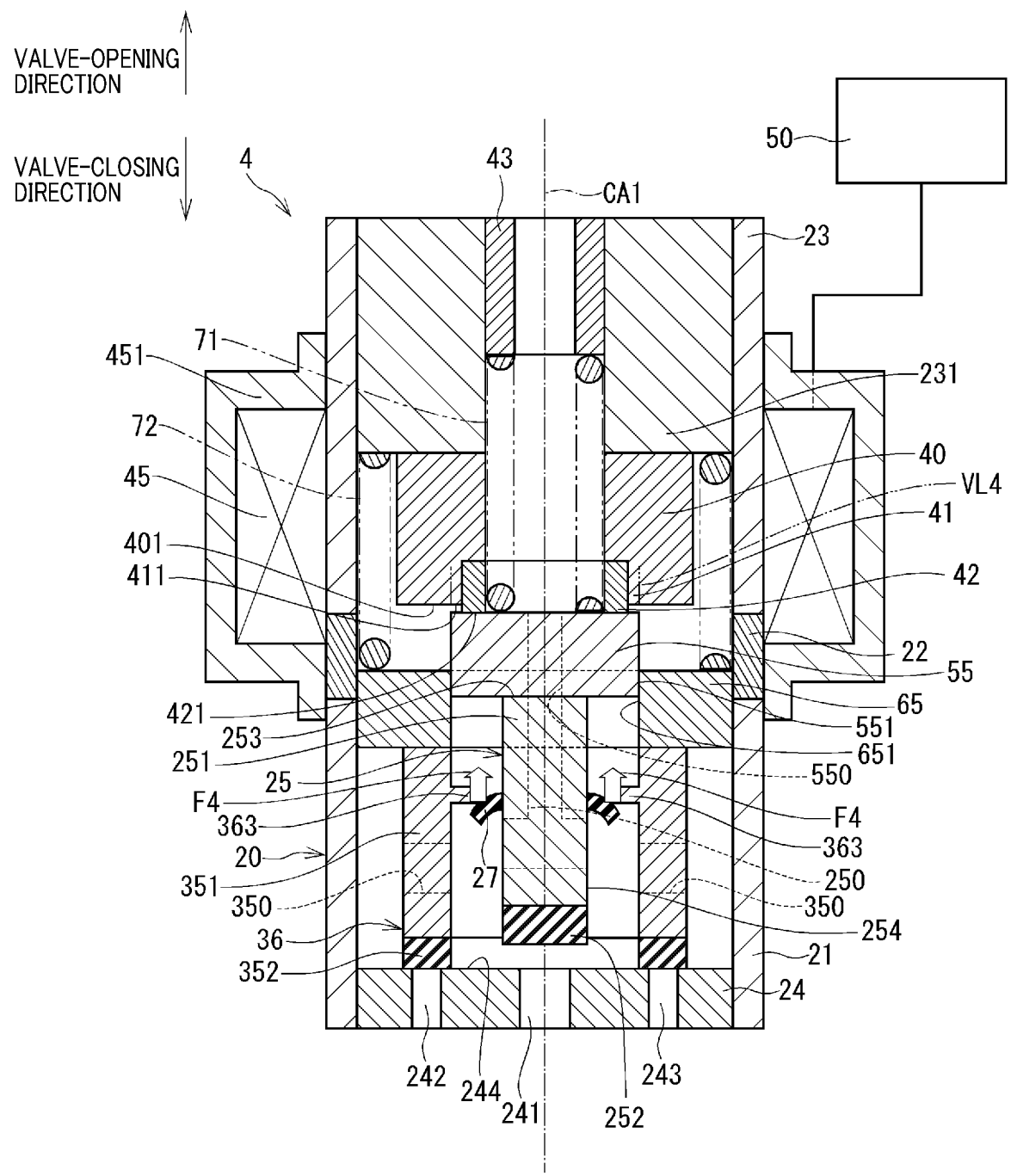
FIG. 14 is a cross-sectional view of the valve apparatus according to the fourth embodiment, the state thereof differing from that in FIG. 13.

When the inner injection hole 241 is opened, as shown in FIG. 14, the elastic member 27 engages with the outer protruding portion 363 and becomes deformed. As a result, restoring force of the elastic member 27 caused by deformation of the elastic member 27 itself acts on the outer valve member 36 so as to move the outer valve member 36 in the valve-opening direction (white arrows F4 in FIG. 14).

When the current further flows to the coil 45, the magnetic attractive force that moves the outer movable core 65 and the outer valve member 36 is generated between the fixed core 40 and the outer movable core 65. The outer movable core 65 and the outer valve member 36 move in the valve-opening direction. When the outer valve member 36 moves in the valve-opening direction, the seal portion 352 separates from the end surface 244. The outer injection holes 242 and 243 are opened.

In the fuel injection valve 4 according to the fourth embodiment, opening and closing of the inner injection hole 241 and the opening and closing of the outer injection holes 242 and 243 can be controlled through control of the energization of the coil 45. As a result, the fourth embodiment can obtain the same effects as the first embodiment.

In the fuel injection valve 4 according to the fourth embodiment, the elastic member 27 that urges the outer valve member 36 in the valve-opening direction upon engaging with the outer protruding portion 363 is provided in the inner valve member 25. When the elastic member 27 engages with the outer protruding portion 363 as a result of the inner valve member 25 moving in the valve-opening direction, the inner valve member 25 moves at a lower speed than that according to the first embodiment.

As a result, impact that occurs when the inner movable core 55 that moves together with the inner valve member 25 collides with the shock absorbing member 42 can be reduced. Consequently, according to the fourth embodiment, impact noise caused by the collision between the inner movable core 55 and the shock absorbing member 42 can be reduced while preventing damage resulting from the collision between the inner movable core 55 and the shock absorbing member 42.

In the fuel injection valve 4 according to the fourth embodiment, when the inner injection hole 241 is open, urging force from the elastic member 27 in the valve-opening direction acts on the outer valve member 36. Therefore, the outer injection holes 242 and 243 open with relative ease. As a result, the magnetic attractive force required to move the outer valve member 36 in the valve-opening direction can be reduced from that according to the first embodiment. Therefore, the physical size of the coil 45 can be reduced. In addition, responsiveness of opening of the outer injection holes 242 and 243 can be improved.

Furthermore, in the fuel injection valve 4 according to the fourth embodiment, when the inner injection hole 241 is open, the restoring force of the elastic member 27 acts on the outer valve member 36 so as to move the outer valve member 36 in the valve-opening direction. Consequently, in cases in which the coil 45 is identical to that according to the first embodiment, the range of the injection amount of fuel gas that can be injected from the fuel injection valve 4 can be widened.

Fifth Embodiment

Figure 15:
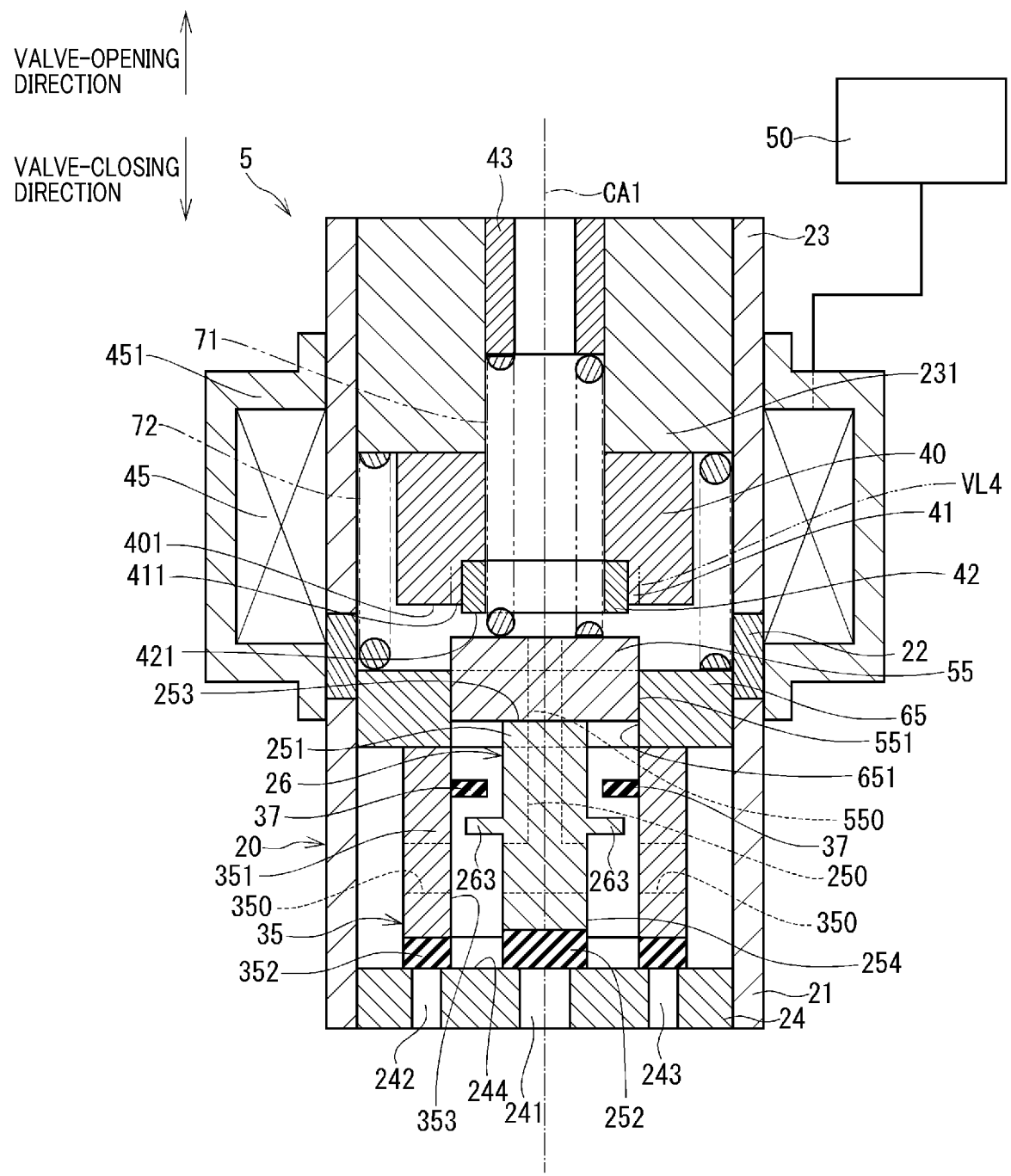
FIG. 15 is a cross-sectional view of a valve apparatus according to a fifth embodiment.
Figure 16:
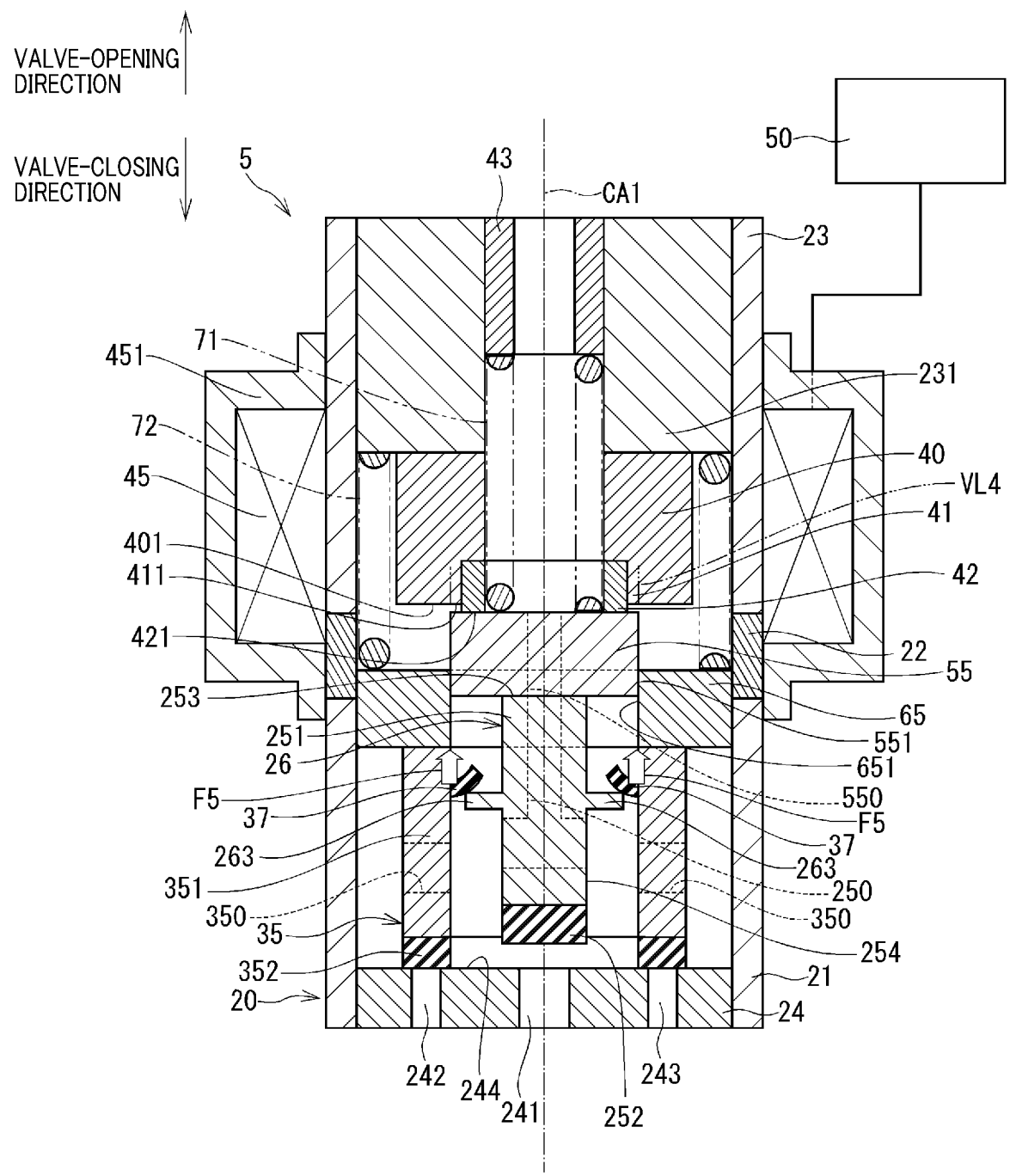
FIG. 16 is a cross-sectional view of the valve apparatus according to the fifth embodiment, the state thereof differing from that in FIG. 15.

Next, a valve apparatus according to a fifth embodiment will be described with reference to FIG. 15 and FIG. 16. The fifth embodiment differs from the first embodiment in that the outer valve member is provided with an elastic member. In addition, the fifth embodiment differs from the first embodiment in terms of the shape of the inner valve member.

A fuel injection valve 5 according to the fifth embodiment includes the housing 20, the inner valve member 26, the outer valve member 35, an elastic member 37, the fixed core 40, the magnetic constriction portion 41, the coil 45, the control unit 50, the inner movable core 55, the outer movable core 65, the first spring 71, and the second spring 72. The inner valve member 26 serves as the other of the first valve member and the second valve member. The outer valve member 36 serves as either of a first valve member and a second valve member.

The elastic member 37 is provided on the side surface 353 of the cylinder portion 351 on the inner surface side in the radial direction. The elastic member 37 is formed so as to protrude in the inner radial direction from the side surface 353. The elastic member 37 is integrated with the outer valve member 35 and moves relative to the housing 20. The elastic member 37 is made of an elastic material. When the inner injection hole 241 is opened, the elastic member 37 engages with the inner protruding portion 263 provided in the inner valve member 26. According to the present embodiment, four elastic members 37 are provided at an even interval on the side surface 353.

Next, workings of the fuel injection valve 5 will be described with reference to FIG. 15 and FIG. 16. When a current is not flowing to the coil 45, the fuel injection valve 5 is in the state shown in FIG. 15. When the magnetic circuit is formed in the periphery of the coil 45, and the magnetic attractive force between the inner movable core 55 and the fixed core 40 increases to a certain extent, the seal portion 252 separates from the end surface 244. The inner injection hole 241 is opened. When the inner injection hole 241 is opened, as shown in FIG. 16, the inner protruding portion 263 engages with the elastic member 37. As a result, the elastic member 37 becomes deformed. The restoring force of the elastic member 37 caused by the deformation of the elastic member 37 itself acts on the outer valve member 35 so as to move the outer valve member 35 in the valve-opening direction (white arrows F5 in FIG. 16).

When the current further flows to the coil 45, the magnetic attractive force that moves the outer movable core 65 and the outer valve member 35 is generated between the fixed core 40 and the outer movable core 65. The outer movable core 65 and the outer valve member 35 moves in the valve-opening direction. When the outer valve member 35 moves in the valve-opening direction, the seal portion 352 separates from the end surface 244. The outer injection holes 242 and 243 are opened.

In the fuel injection valve 5 according to the fifth embodiment, opening and closing of the inner injection hole 241 and the opening and closing of the outer injection holes 242 and 243 can be controlled through control of the energization of the coil 45. As a result, the fifth embodiment can obtain the same effects as the first embodiment.

The fuel injection valve 5 according to the fifth embodiment includes the elastic member 37 that urges the outer valve member 35 in the valve-opening direction upon engaging with the inner protruding portion 263. When the elastic member 37 engages with the inner protruding portion 263 as a result of the inner valve member 26 moving in the valve-opening direction, the inner valve member 26 moves at a lower speed than that according to the first embodiment. As a result, impact that occurs when the inner movable core 55 that moves together with the inner valve member 26 collides with the shock absorbing member 42 can be reduced. Consequently, according to the fifth embodiment, impact noise caused by the collision between the inner movable core 55 and the shock absorbing member 42 can be reduced while preventing damage resulting from the collision between the inner movable core 55 and the shock absorbing member 42.

In addition, in the fuel injection valve 5 according to the fifth embodiment, when the inner injection hole 241 is open, the urging force in the valve-opening direction resulting from the restoring force of the elastic member 37 acts on the outer valve member 35. Therefore, the outer injection holes 242 and 243 open with relative ease. As a result, the magnetic attractive force required to move the outer valve member 35 in the valve-opening direction can be reduced from that according to the first embodiment. Therefore, the physical size of the coil 45 can be reduced. In addition, responsiveness regarding opening of the outer injection holes 242 and 243 can be improved.

Furthermore, in the fuel injection valve 5 according to the fifth embodiment, when the inner injection hole 241 is open, the restoring force of the elastic member 37 acts on the outer valve member 35 so as to move the outer valve member 35 in the valve-opening direction. Consequently, in cases in which the coil 45 is identical to that according to the first embodiment, the range of the injection amount of fuel gas that can be injected from the fuel injection valve 5 can be widened.

Sixth Embodiment

Next, a valve apparatus according to a sixth embodiment will be described with reference to FIG. 17 and FIG. 18. The sixth embodiment differs from the first embodiment in terms of the shapes of the inner valve member, the inner movable core, the outer valve member, and the outer movable core.

A fuel injection valve 6 according to the sixth embodiment includes the housing 20, an inner valve member 28, an outer valve member 38, the fixed core 40, the magnetic constriction portion 41, the coil 45, the control unit 50, an inner movable core 56, an outer movable core 66, a sliding member 67, the first spring 71, and the second spring 72. The inner valve member 28 serves as a first valve member. The outer valve member 38 serves as a second valve member. The inner movable core 56 serves as a first movable core. The outer movable core 66 serves as a second movable core.

The inner valve member 28 is a substantially rod-shaped member. The inner valve member 28 includes a shaft portion 281 and a seal portion 282. The inner valve member 28 is provided so as to move relative to the housing 20.

The shaft portion 281 is a rod-shaped section that is made of a non-magnetic material. The shaft portion 281 is provided such that an end portion thereof on the valve-closing direction side is positioned in the inner radial direction from the shock absorbing member 42. The shaft portion 281 has a passage 280 that opens onto an end surface 283 of the shaft portion 281 on the valve-opening direction side and a side surface 284 of the shaft portion 281 on the outer side in the radial direction near the seal portion 282. Fuel flows through the passage 280.

The seal portion 282 is provided in an end portion of the shaft portion 281 on the valve-closing direction side. The seal portion 282 is made of a material that has elasticity, such as rubber. The seal portion 282 is formed such to seal the opening of the inner injection hole 241 on the first cylinder portion 21 side, when the seal portion 282 comes into contact with the end surface 244 of the injection portion 24 on the first cylinder portion 21 side. As a result, the inner valve member 28 opens and closes the inner injection hole 241.

The outer valve member 38 is formed into an annular shape from a material having elasticity, such as rubber. The outer valve member 38 is positioned in the outer radial direction from the inner valve member 28 and moves relative to the housing 20. The outer valve member 38 is also capable of coming into contact with the end surface 244 of the injection portion 24. The outer valve member 38 is formed so as to seal the openings of the outer injection holes 242 and 243 on the first cylinder portion 21 side when the outer valve member 38 comes into contact with the end surface 244 of the injection portion 24. As a result, the outer valve member 38 opens and closes the outer injection holes 242 and 243.

The inner movable core 56 is formed into a substantially cylindrical shape from a magnetic material. The inner movable core 56 is provided on the side surface 284 in an end portion on the valve-opening direction side of the shaft portion 281 of the inner valve member 28. The inner movable core 56 moves back and forth, integrally with the inner valve member 28. When the coil 45 forms the magnetic field, the magnetic attractive force is generated between the inner movable core 56 and the fixed core 40. When the inner movable core 56 moves in the valve-opening direction, the inner movable core 56 comes into contact with the end surface 421 of the shock absorbing member 42.

The outer movable core 66 is formed into a substantially cylindrical shape from a magnetic material. The outer movable core 66 is positioned in the outer radial direction from the inner valve member 28 and the inner movable core 56. The outer valve member 38 is provided on an end portion of the outer movable core 66 in the valve-closing direction side. The outer movable core 66 moves back and forth, integrally with the outer valve member 38. The outer movable core 66 has a passage 660 that communicates with the passage 280 that opens onto the side surface 284 of the inner valve member 28. When the coil 45 forms the magnetic field, the magnetic attractive force is generated between the outer movable core 66 and the fixed core 40.

The sliding member 67 is provided on a side surface 661 of the outer movable core 66 on the inner side in the radial direction. The sliding member 67 is made of a non-magnetic material. According to the present embodiment, the sliding member 67 slides over the side surface 284 of the inner valve member 28.

Figure 17:
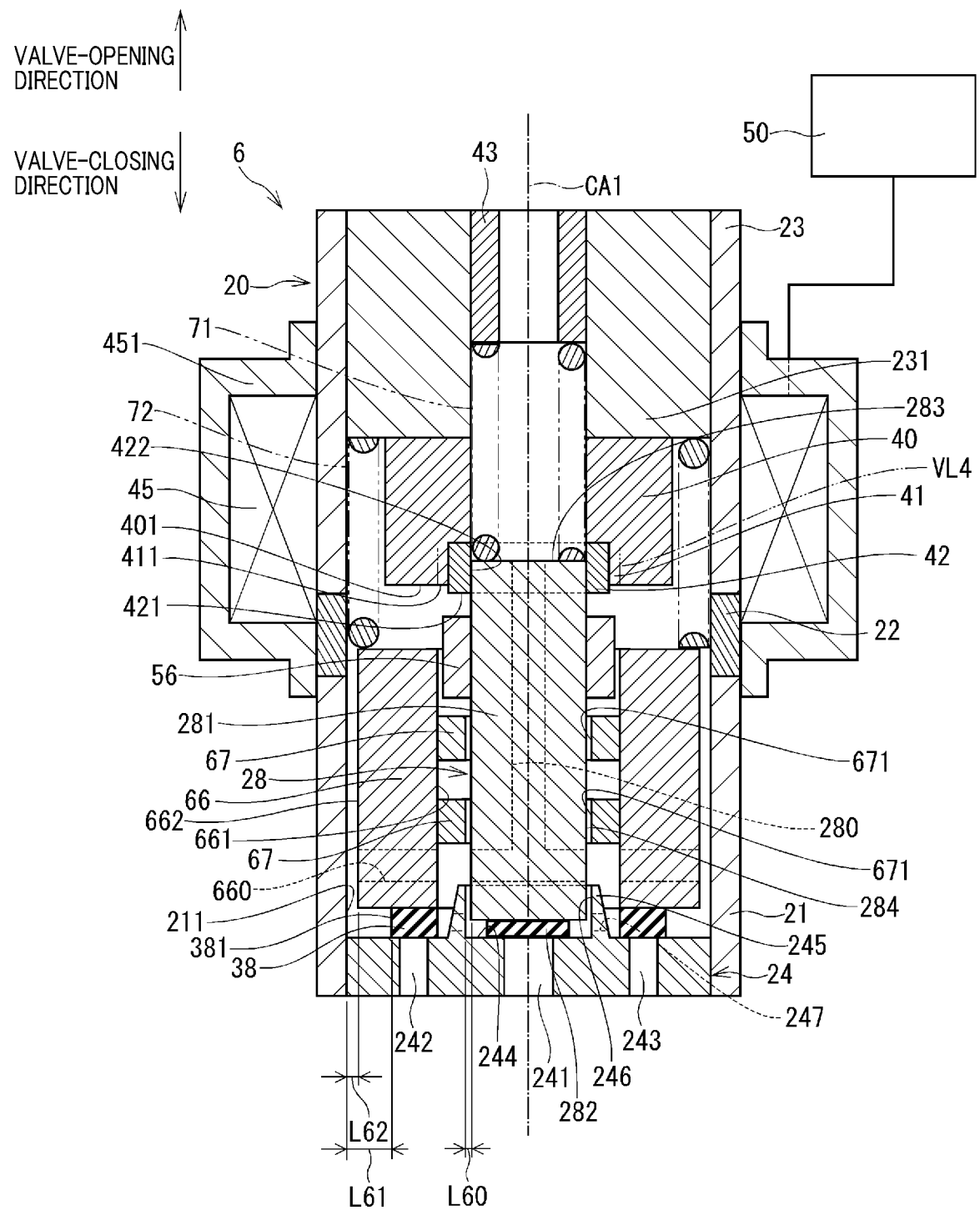
FIG. 17 is a cross-sectional view of a valve apparatus according to a sixth embodiment.
Figure 18:
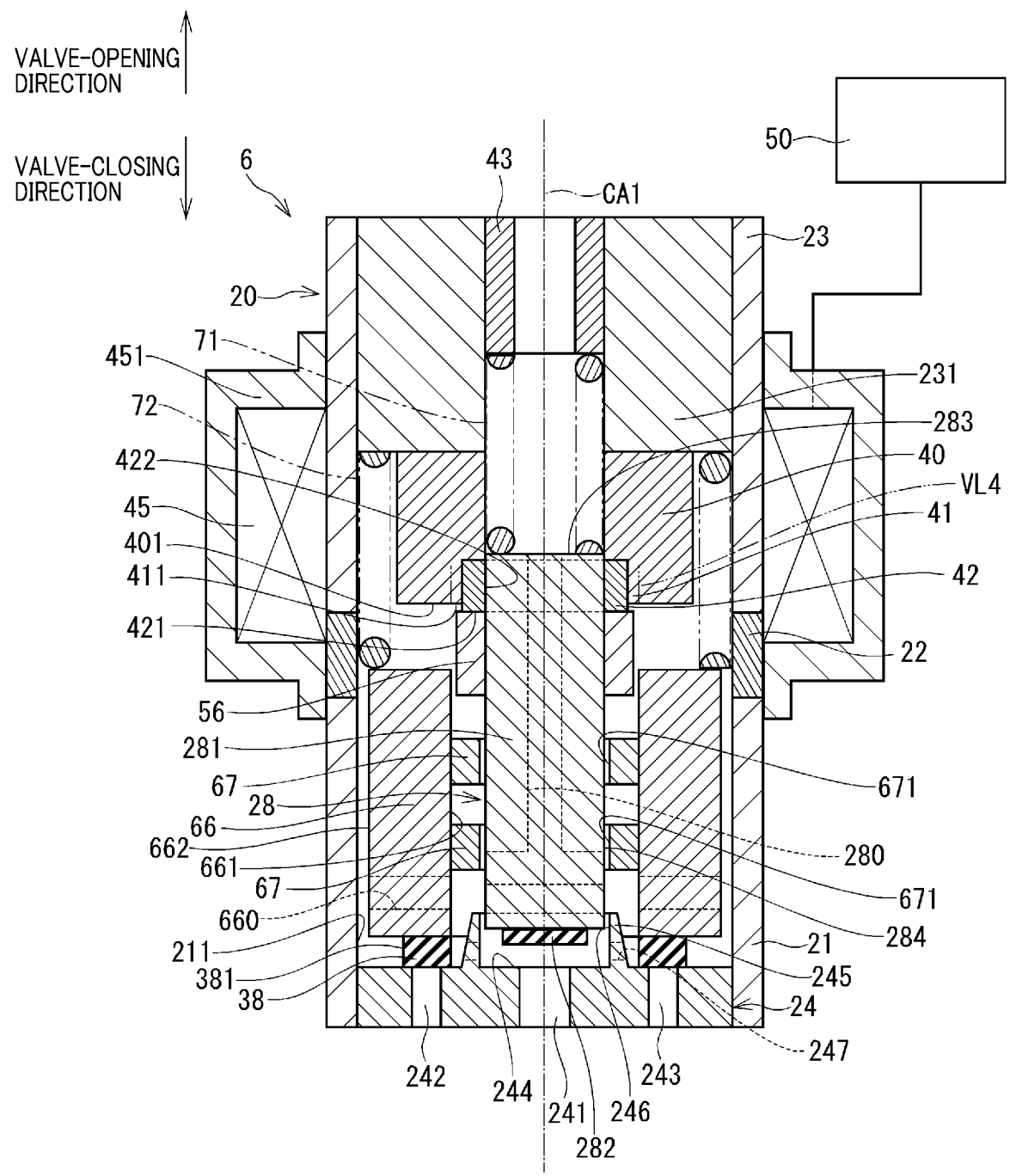
FIG. 18 is a cross-sectional view of the valve apparatus according to the sixth embodiment, the state thereof differing from that in FIG. 17.

As shown in FIG. 17, the injection portion 24 of the housing 20 provided in the fuel injection valve 6 has a protrusion 245 that is formed so as to protrude in the valve-opening direction from the end surface 244. The protrusion 245 is formed into an annular shape in the periphery of the end surface 244 with which the seal portion 282 comes into contact. A side surface 246 of the protrusion 245 on the inner side in the radial direction slides over the end portion on the valve-closing direction side of the shaft portion 281 of the inner valve member 28. The protrusion 245 has a passage 247 that communicates between the inner radial direction side and the outer radial direction side of the protrusion 245.

In the fuel injection valve 6, a distance between a side surface 381 of the outer valve member 38 on the outer side in the radial direction and an inner wall surface 211 of the housing 20 that opposes the side surface 381 is a distance L61. In addition, a distance between a side surface 662 of the outer movable core 66 on the outer side in the radial direction and the inner wall surface 211 of the housing 20 that opposes the side surface 662 is a distance L62. In the fuel injection valve 6, the distances L61 and L62 are greater than a distance L60 between a side surface 671 of the sliding member 67 on the inner side in the radial direction and the side surface 284 of the inner valve member 28 on the outer side in the radial direction that opposes the side surface 671 of the sliding member 67.

Next, workings of the fuel injection valve 6 will be described with reference to FIG. 17 and FIG. 18. When a current is not flowing to the coil 45, the fuel injection valve 6 is in the state shown in FIG. 17. A magnetic circuit is formed in the periphery of the coil 45 as a result of energization of the coil 45. When the magnetic circuit is formed in the periphery of the coil 45, and the magnetic attractive force between the inner movable core 56 and the fixed core 40 increases to a certain extent, the seal portion 282 separates from the end surface 244. As a result, the inner injection hole 241 is opened. As shown in FIG. 18, when the inner injection hole 241 is open, the end portion on the valve-closing direction side of the inner valve member 28 is in a position capable of sliding over the side surface 246 of the protrusion 245 in the injection portion 24. In addition, the end portion on the valve-opening direction side of the inner valve member 28 is in a position capable of sliding over the side surface 422 on the inner side in the radial direction of the shock absorbing member 42.

When the current further flows to the coil 45, the magnetic attractive force is generated between the fixed core 40 and the outer movable core 66. When the magnetic attractive force becomes large enough to move the outer movable core 66 and the outer valve member 38, the outer movable core 66 and the outer valve member 38 move in the valve-opening direction while being guided along the inner valve member 28 by the sliding member 67 that slides over the inner valve member 28. When the outer valve member 38 moves in the valve-opening direction, the outer valve member 38 separates from the end surface 244. The outer injection holes 242 and 243 are opened.

In the fuel injection valve 6 according to the sixth embodiment, opening and closing of the inner injection hole 241 and the opening and closing of the outer injection holes 242 and 243 can be controlled through control of the energization of the coil 45. As a result, the sixth embodiment can obtain the same effects as the first embodiment.

In the fuel injection valve 6 according to the sixth embodiment, the end portion in the valve-closing direction of the inner valve member 28 that is made of a non-magnetic material slides over the side surface 246 of the injection portion 24 that is made of a non-magnetic material. The end portion on the valve-opening direction side of the inner valve member 28 slides over the side surface 422 of the shock absorbing member 42 that is made of a non-magnetic material. In this way, in the fuel injection valve 6, the sliding sections are limited to non-magnetic materials. Therefore, surface roughening in the sliding sections can be prevented at a lower cost compared to cases in which a relatively expensive surface coating, such as diamond-like carbon (DLC), is applied. Consequently, according to the sixth embodiment, occurrence of defects such as seizing of the inner valve member 28 due to surface roughening can be suppressed at a low cost.

In addition, in the fuel injection valve 6 according to the sixth embodiment, the inner valve member 28 guides the reciprocating movement of the inner valve member 28 itself, by sliding movement being performed in only the end portion on the valve-closing direction side and the end portion on the valve-opening direction side. As a result, in the fuel injection valve 6, the number of sliding sections for guiding the movement of the inner valve member 28 can be reduced to the greatest extent possible. Therefore, processing time required for the sliding sections can be shortened. Consequently, according to the sixth embodiment, the occurrence of surface roughening in the sliding sections can be suppressed at an even lower cost.

In the fuel injection valve 6 according to the sixth embodiment, the outer movable core 66 and the outer valve member 38 move in the valve-opening direction while being guided along the inner valve member 28 that is made of the non-magnetic material, by the sliding member 67 that slides over the inner valve member 28. As a result, surface roughening of the sliding sections can be prevented as described above. Consequently, according to the sixth embodiment, occurrence of defects such as seizing of the outer valve member 38 due to surface roughening can be suppressed.

In addition, in the fuel injection valve 6 according to the sixth embodiment, the distance L61 between the outer valve member 38 and the housing 20 and the distance L62 between the outer movable core 66 and the housing 20 are greater than the distance L60 between the sliding member 67 and the inner valve member 28. As a result, even should the outer movable core 66 and the outer valve member 38 move in a direction perpendicular to the center axis CA1, the outer movable core 66 and the outer valve member 38 can be prevented from sliding over the first cylinder portion 21 of the housing 20 and the like that are made of magnetic materials.

Consequently, according to the sixth embodiment, occurrence of defects such as seizing of the outer valve member 38 due to surface roughening in the sliding sections can be suppressed. In addition, the outer valve member 38 is guided by the inner valve member 28 that moves back and forth on the center axis CA1. Therefore, movement of the outer valve member 38 in the direction perpendicular to the center axis CA1 can be suppressed. As a result, valve-opening characteristics of the outer injection holes 242 and 243 can be stabilized.

Seventh Embodiment

Next, a valve apparatus according to a seventh embodiment will be described with reference to FIG. 19 to FIG. 22. The seventh embodiment differs from the first embodiment in the details of the control process for the energization of the coil.

Figure 19:
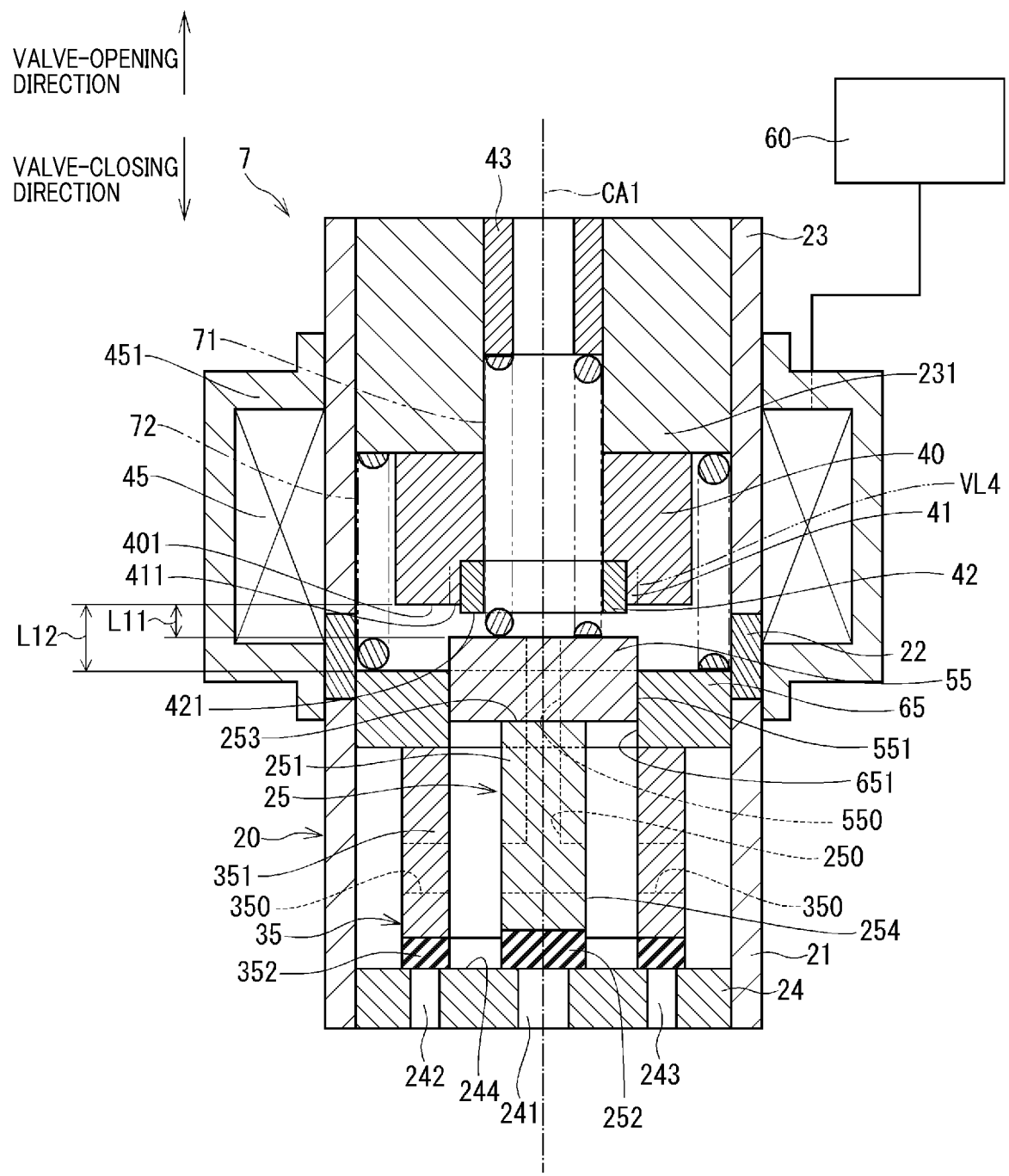
FIG. 19 is a cross-sectional view of a valve apparatus according a seventh embodiment.

As shown in FIG. 19, a fuel injection valve 7 according to the seventh embodiment includes the housing 20, the inner valve member 25, the outer valve member 35, the fixed core 40, the magnetic constriction portion 41, the coil 45, a control unit 60, the inner movable core 55, the outer movable core 65, the first spring 71, and the second spring 72.

Figure 20:
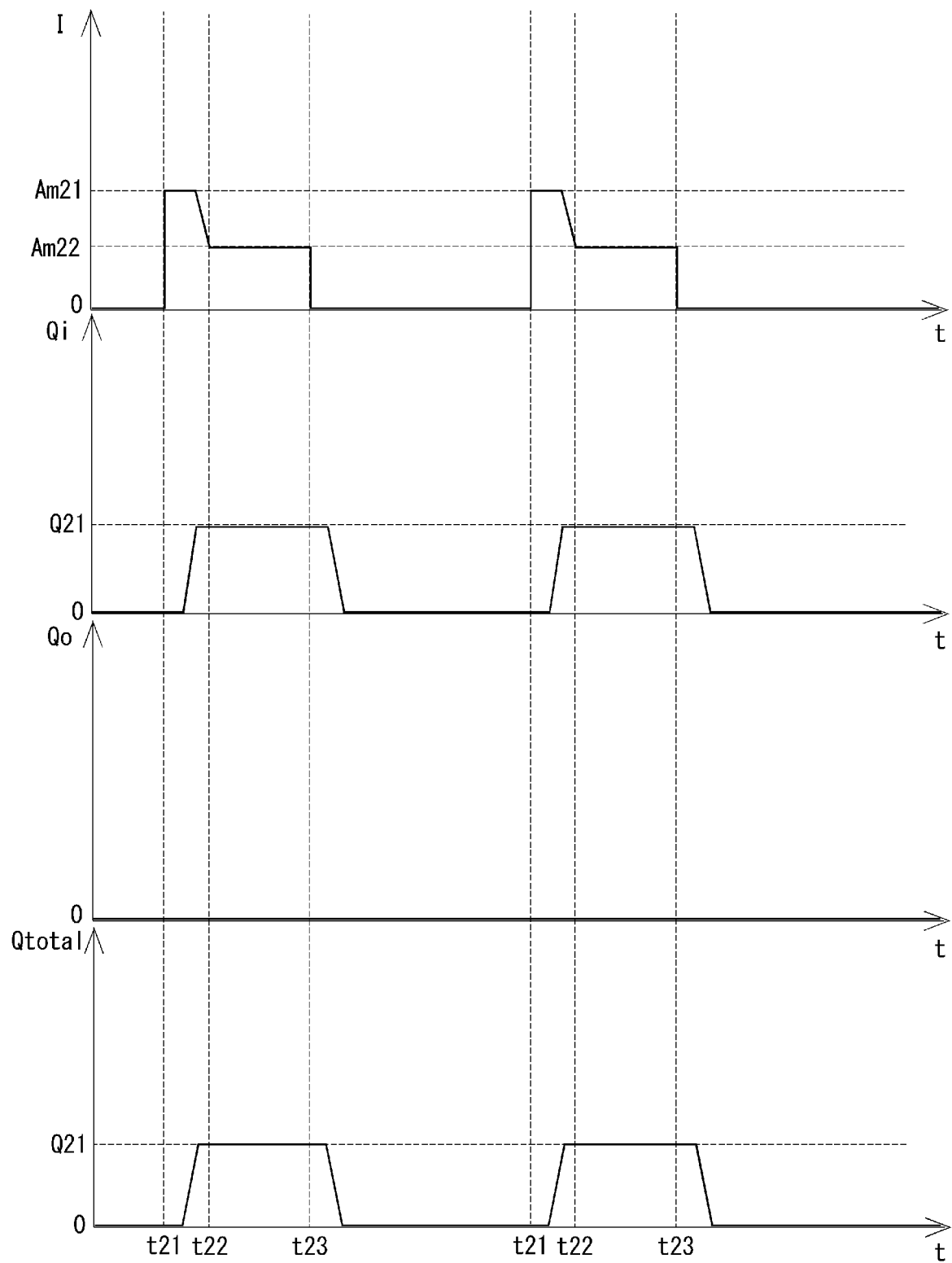
FIG. 20 is a characteristics diagram of changes over time in the characteristics of the valve apparatus according to the seventh embodiment.
Figure 21:
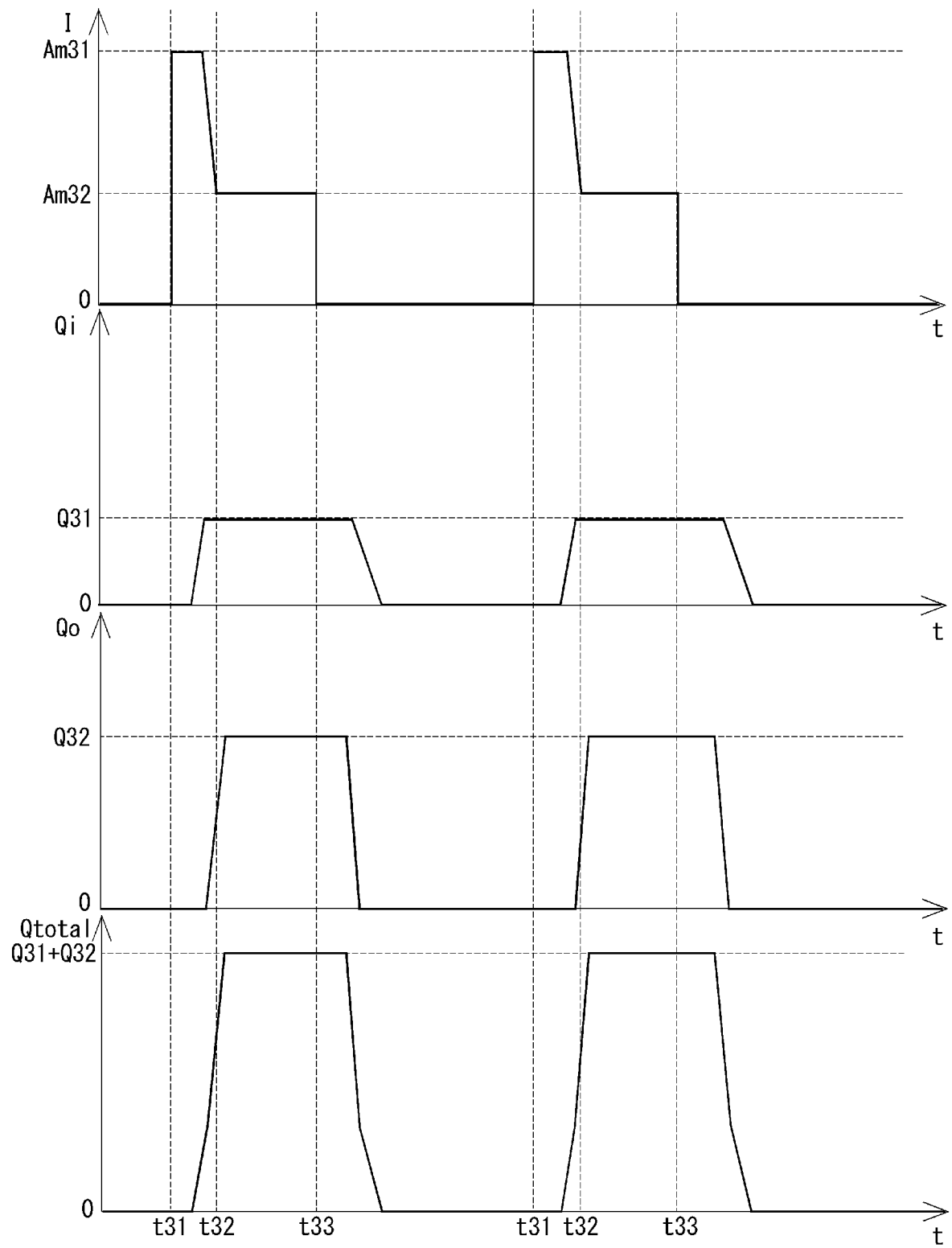
FIG. 21 is a characteristics diagram of changes over time in the characteristics of the valve apparatus according to the seventh embodiment, the state thereof differing from that in FIG. 20.
Figure 22:
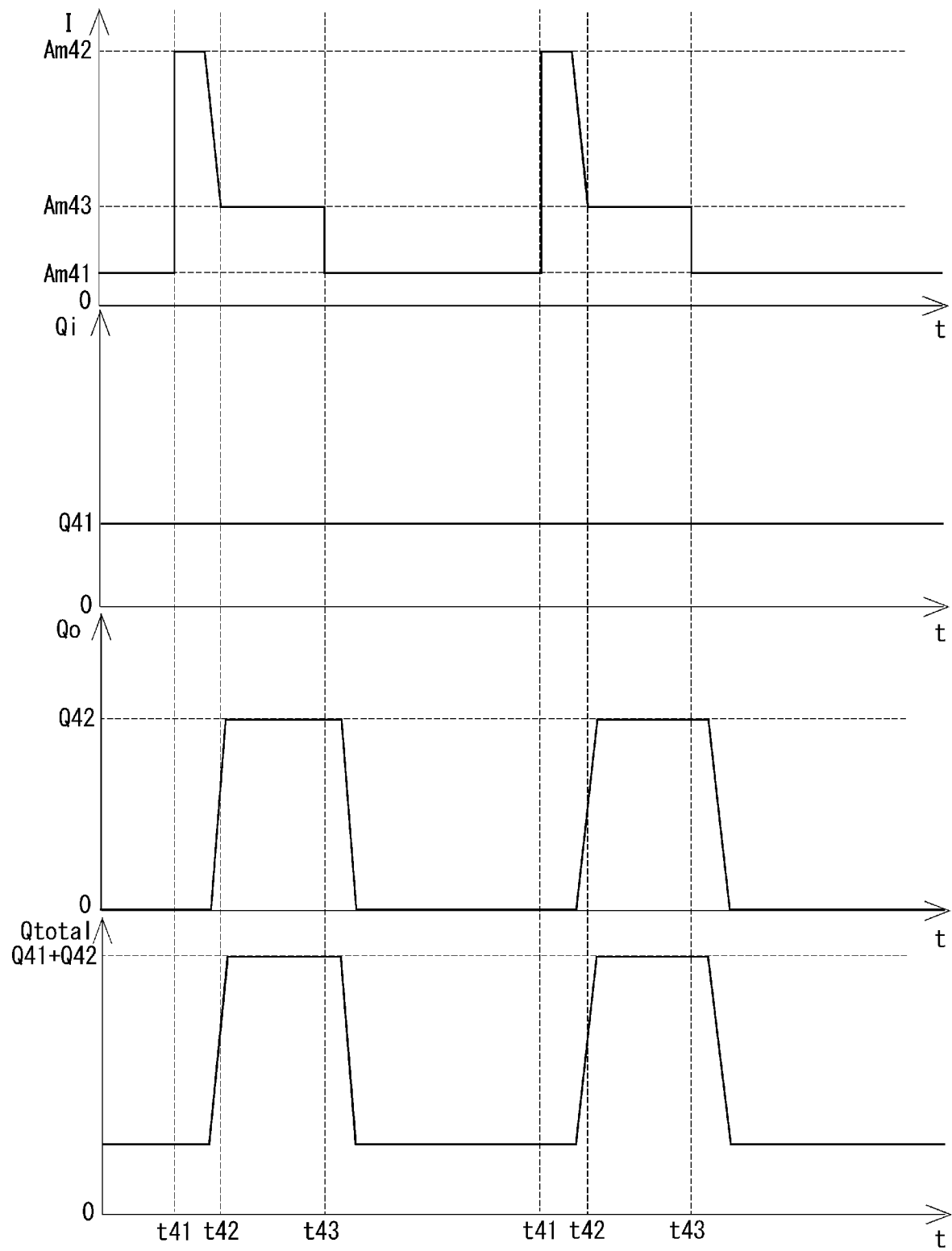
FIG. 22 is a characteristics diagram of changes over time in the characteristics of the valve apparatus according to the seventh embodiment, the state thereof differing from those in FIG. 20 and FIG. 21.

Injection control of fuel gas performed by the control unit 60 will be described with reference to FIG. 20 to FIG. 22. FIG. 20 to FIG. 22 show a current value I, an injection amount Qi of fuel gas per unit time from the inner injection hole 241, an injection amount Qo of fuel gas per unit time from the outer injection holes 242 and 243, and a total injection amount Qtotal of fuel gas per unit time, based on the magnitude of the energization amount to the coil 45. FIG. 20 to FIG. 22 show the characteristics for when the fuel gas is injected twice.

The characteristics diagram shown in FIG. 20 shows characteristics of the fuel injection valve 7 when the fuel gas is injected from only the inner injection hole 241. The control unit 60 starts energization of the coil 45 at time t21. Immediately thereafter, the control unit 60 sends a current that has a current value Am21 to the coil 45. As a result, the inner valve member 25 separates from the end surface 244 of the injection portion 24.

The fuel gas inside the housing 20 is injected from the inner injection hole 241. When the fuel gas inside the housing 20 is injected from the inner injection hole 241, the control unit 60 sets the current value of the current sent to the coil 45 to a current value Am22 that is less than the current value Am21 (time t22 in FIG. 18).

While the current is flowing to the coil 45, the fuel injection amount per unit time of the fuel gas that is injected from the inner nozzle 241 is in an injection amount Q21 at maximum. Therefore, the total injection amount of fuel gas per unit time in the fuel injection valve 7 according to the seventh embodiment is an injection amount Q21.

The characteristics diagram shown in FIG. 21 shows the characteristics of the fuel injection valve 7 when the fuel gas is injected from the inner injection hole 241 and the outer injection holes 242 and 243 in this order. The control unit 60 starts energization of the coil 45 at time t31. Immediate thereafter, the control unit 60 sends a current that has a current value Am31 to the coil 45. As a result, the inner valve member 25 separates from the end surface 244 of the injection portion 24.

The fuel gas inside the housing 20 is injected from the inner injection hole 241. When the fuel gas inside the housing 20 is injected from the inner injection hole 241, the control unit 60 sets the current value of the current sent to the coil 45 to a current value Am32 that is less than the current value Am31 (time t32 in FIG. 19).

While the current that has the current value Am32 is flowing through the coil 45, the outer injection holes 242 and 243 are open. The fuel gas inside the housing 20 is injected from the inner injection hole 241 and the outer injection holes 242 and 243. The fuel injection amount at this time is a total amount of an injection amount Q31 from the inner injection hole 241 and an injection amount Q32 from the outer injection holes 242 and 243.

At time t33, when energization of the coil 45 is ended, the outer injection holes 242 and 243 are closed. Subsequently, the inner injection hole 241 is closed.

The characteristics diagram shown in FIG. 22 shows the characteristics of the fuel injection valve 7 when the fuel gas is intermittently injected from the outer injection holes 242 and 243 in a state in which the fuel gas is continuously injected from the inner injection hole 241. The control unit 60 sends a current that has a current value Am41 to the coil 45 so as to maintain the state in which the inner valve member 25 is separated from the end surface 244 of the injection portion 24.

At time t41, the control unit 60 sends a current that has a current value Am 42 that is greater than the current value Am 41 to the coil 45. As a result, the outer valve member 35 separates from the injection portion 24. Therefore, the fuel gas inside the housing 20 is also injected from the outer injection holes 242 and 243, in addition to the inner injection hole 241.

When the fuel gas is injected from the outer injection holes 242 and 243, the control unit 60 sets the current value of the current sent to the coil 45 to a current value Am 43 that is less than the current value Am42 and greater than the current value Am41 (time t42 in FIG. 20). The fuel injection amount at this time is a total amount of an injection amount Q41 from the inner injection hole 241 and an injection amount Q42 from the outer injection holes 242 and 243.

At time t43, when energization of the coil 45 is ended, the outer injection holes 242 and 243 are closed. Subsequently, the inner injection hole 241 is closed.

In the fuel injection valve 7 according to the seventh embodiment, immediately after the start of energization of the coil 45, a relatively high current is sent to the coil 45. As a result, the inner injection hole 241 is promptly opened. Therefore, the fuel gas inside the housing 20 is injected from the inner injection hole 241.

When the fuel gas inside the housing 20 is injected outside the housing 20, pressure within the housing 20 decreases. Therefore, the inner valve member 25 and the outer valve member 35 easily separate from the injection portion 24.

Consequently, according to the seventh embodiment, valve-opening responsiveness during injection of fuel gas can be improved.

In addition, in the fuel injection valve 7, the amount of time over which the current is sent to the coil 45 can be shortened because the valve-opening responsiveness during injection of fuel gas is improved. As a result, heat generation caused by energization of the coil 45 can be suppressed. In addition, electrical energy can be conserved. Therefore, energy consumption can be reduced.

Eighth Embodiment

Next, a valve apparatus according to an eighth embodiment will be described with reference to FIG. 23 to FIG. 29. The eighth embodiment differs from the first embodiment in the details of the current control process performed by the control unit.

Figure 23:
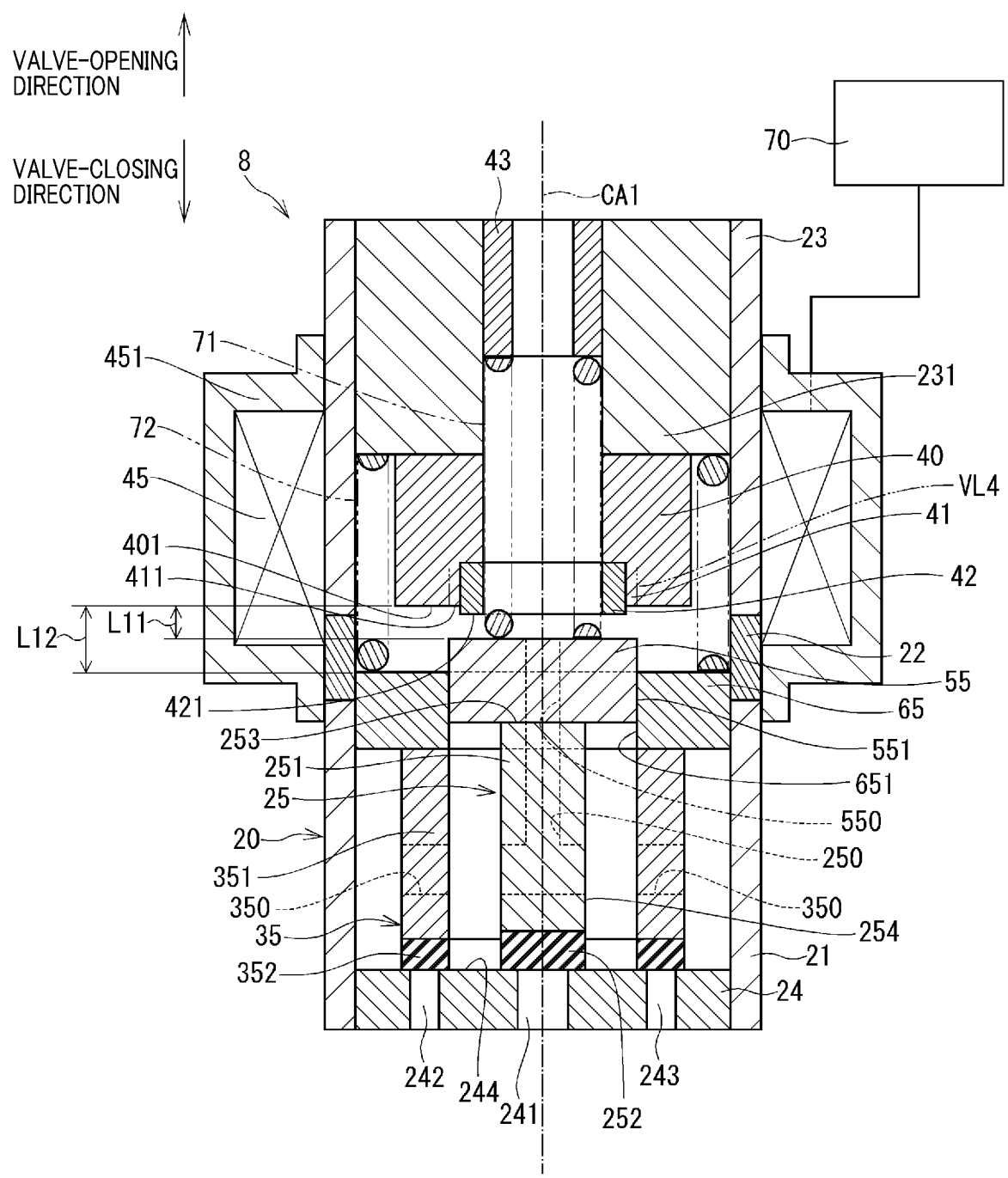
FIG. 23 is a cross-sectional view of a valve apparatus according to an eighth embodiment.

As shown in FIG. 23, a fuel injection valve 8 according to the eighth embodiment includes the housing 20, the inner valve member 25, the outer valve member 35, the fixed core 40, the magnetic constriction portion 41, the coil 45, a control unit 70, the inner movable core 55, the outer movable core 65, the first spring 71, and the second spring 72.

Injection control of fuel gas performed by the control unit 70 and operation of the fuel injection valve 8 will be described with reference to FIG. 24 to FIG. 27.

Figure 24:
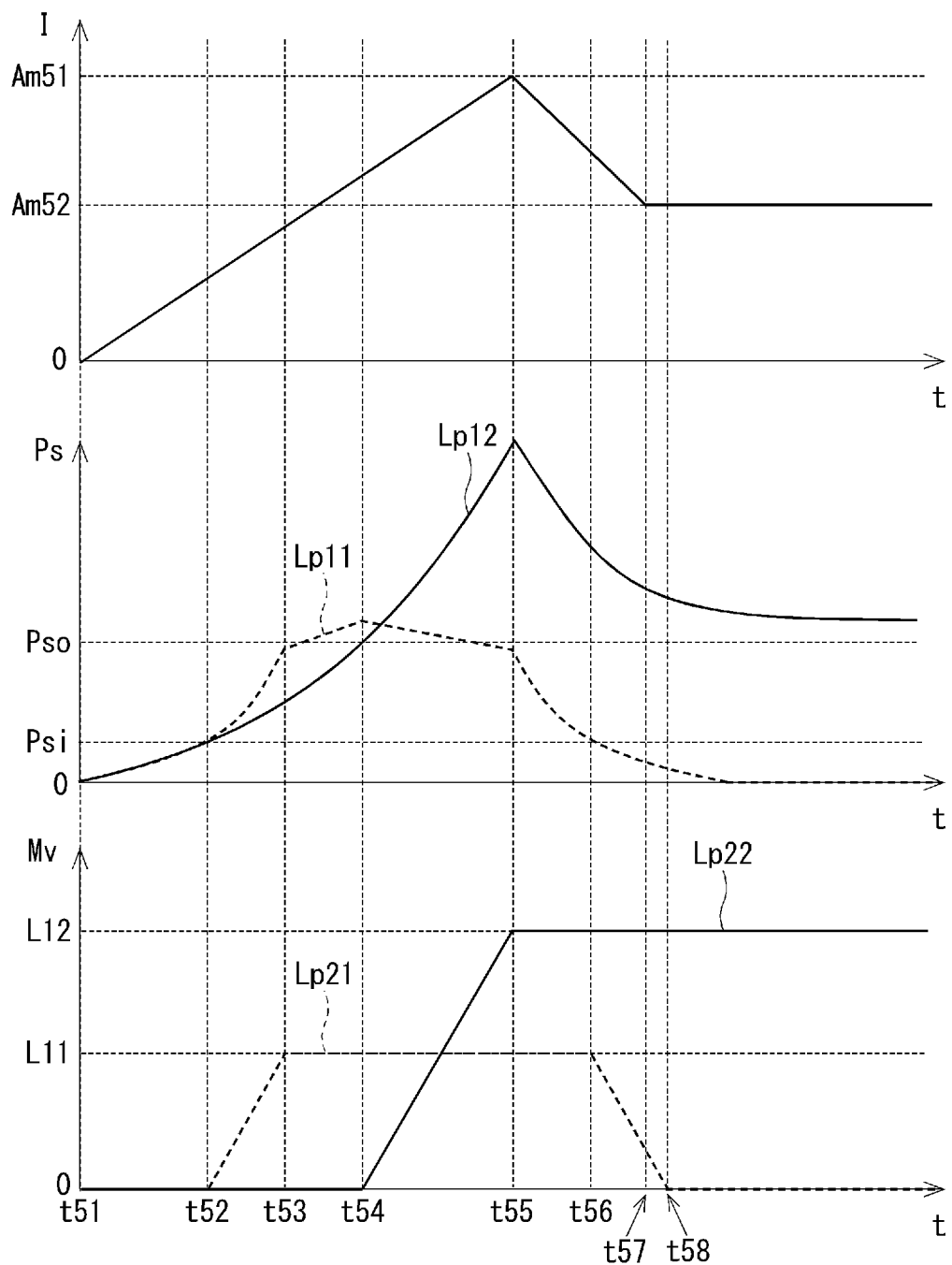
FIG. 24 is a characteristics diagram of changes over time in the characteristics of the valve apparatus according to the eighth embodiment.

FIG. 24 shows changes over time in the current value I, magnetic attractive force Ps between the movable cores and the fixed core 40, and lift amount Mv of the valve members. In the characteristics diagram showing the magnetic attractive force Ps between the movable cores and the fixed core 40, the magnetic attractive force between the inner movable core 55 and the fixed core 40 is indicated by a dotted line Lp11.

Figure 25:
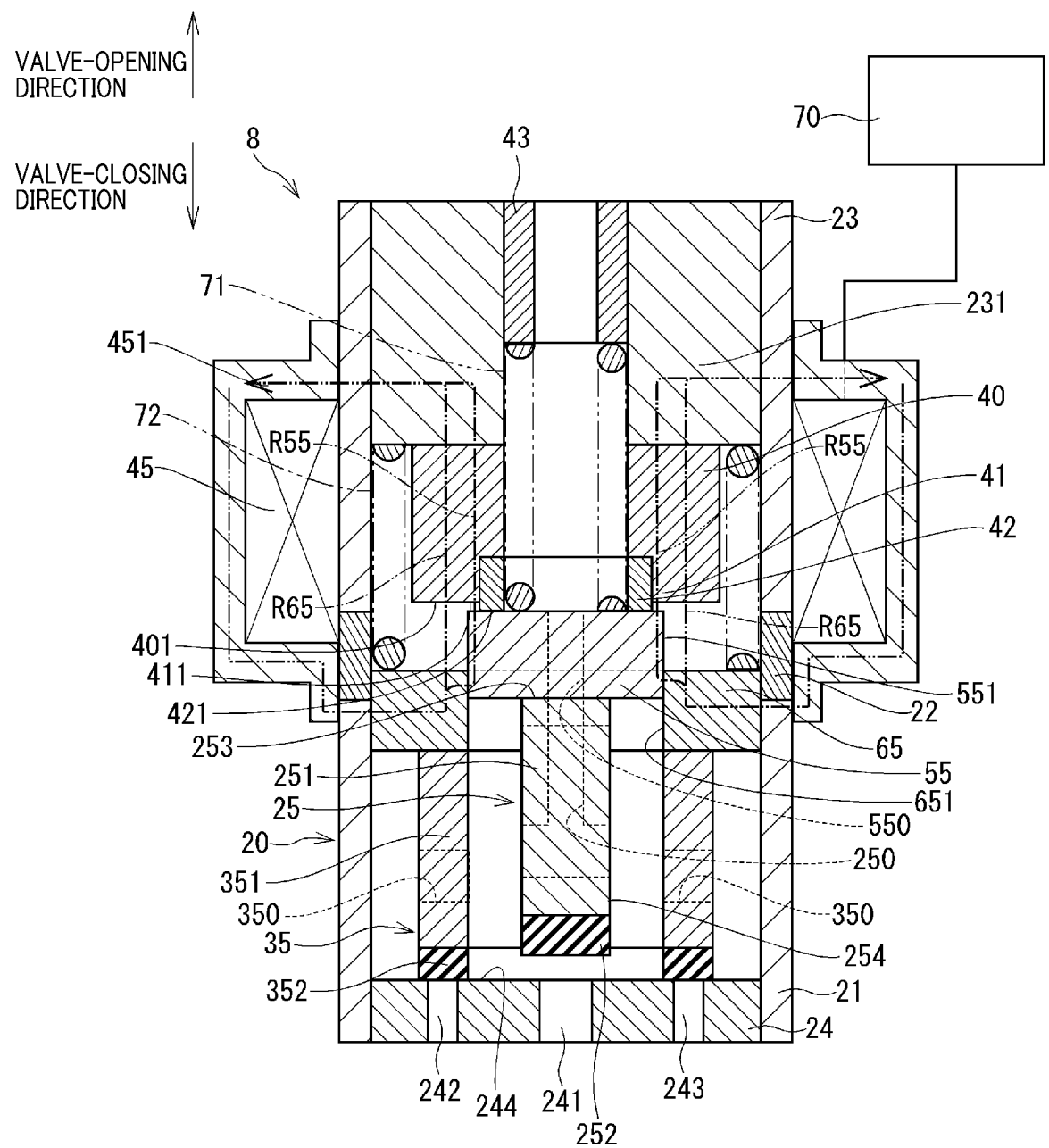
FIG. 25 is a cross-sectional view of the valve apparatus according to the eighth embodiment, the state thereof differing from that in FIG. 23.
Figure 26:
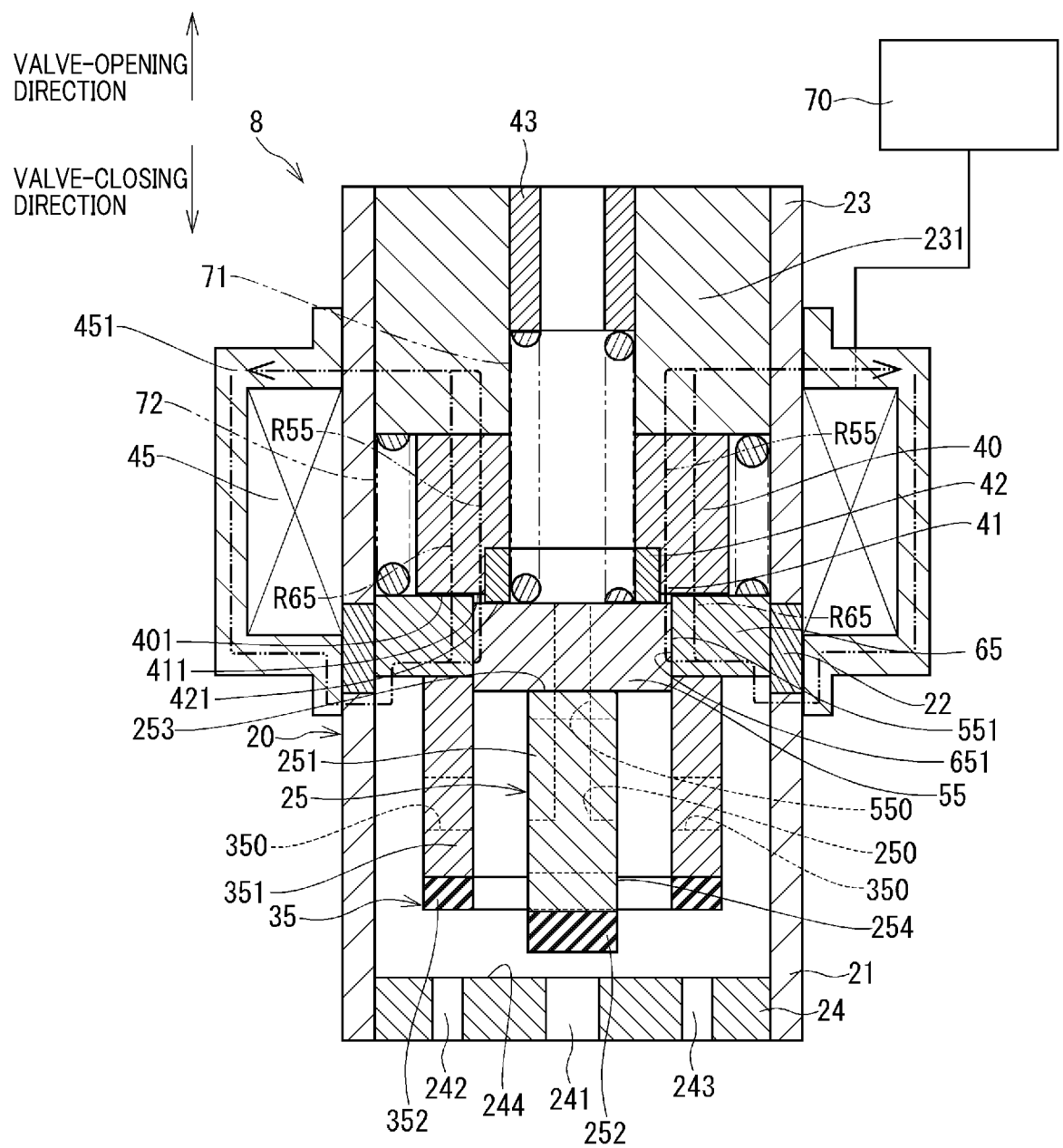
FIG. 26 is a cross-sectional view of the valve apparatus according to the eighth embodiment, the state thereof differing from those in FIG. 23 and FIG. 25.
Figure 27:
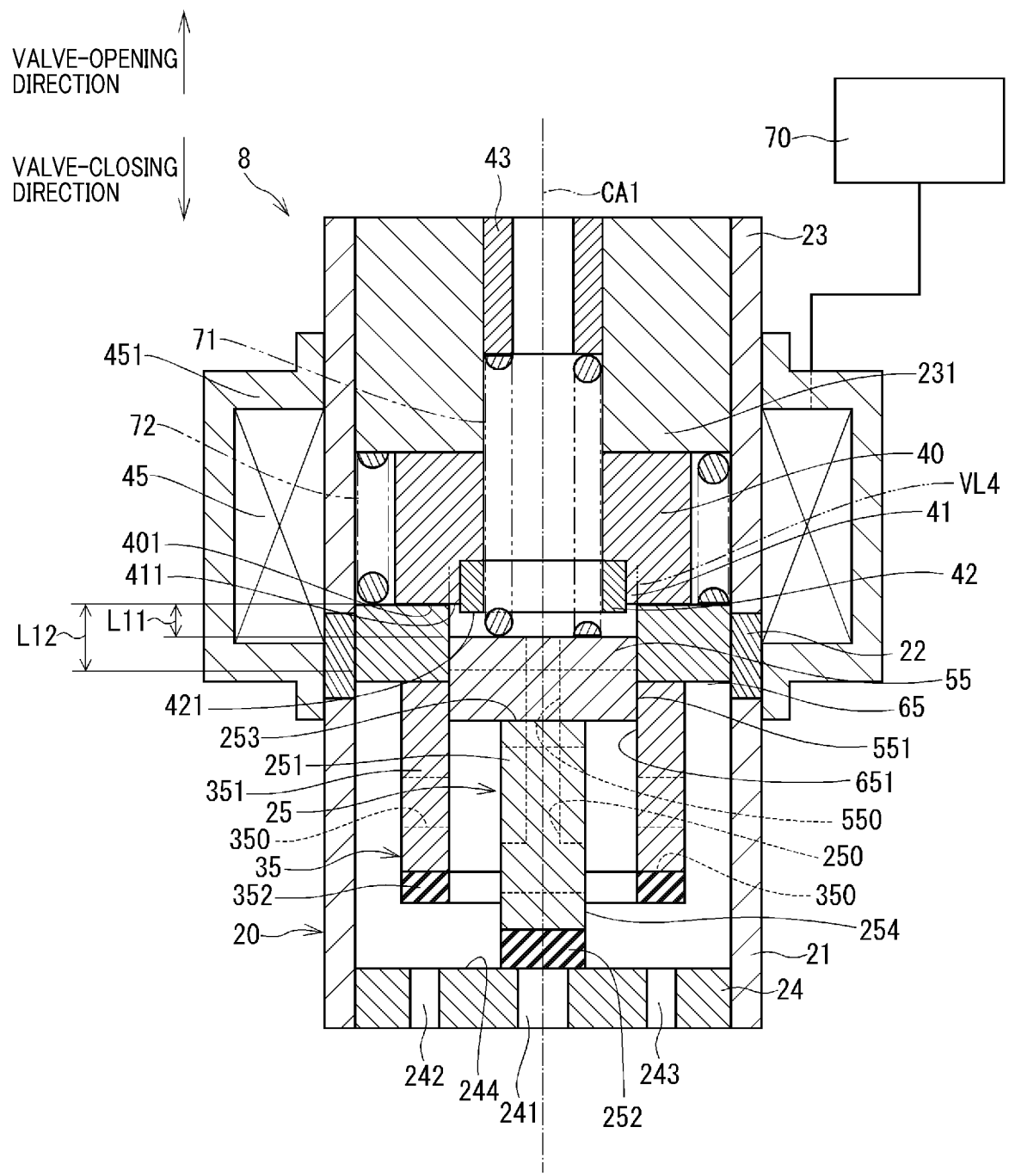
FIG. 27 is a cross-sectional view of the valve apparatus according to the eighth embodiment, the state thereof differing from those in FIG. 23, FIG. 25, and FIG. 26.

The magnetic attractive force between the outer movable core 65 and the fixed core 40 is indicated by a solid line Lp12. In addition, in the characteristics diagram showing the lift amount Mv of the valve members, the lift amount of the inner valve member 25 is indicated by a dotted line Lp21. The lift amount of the outer valve member 35 is indicated by a solid line Lp22. FIG. 25 to FIG. 27 show the fuel injection valve 8 in differing states.

As shown in FIG. 24, the control unit 70 starts energization of the coil 45 at time t51. When the current that flows through the coil 45 gradually increases, the magnetic attractive force Ps between the movable cores and the fixed core 40 also increases. At time t52, the magnetic attractive force between the inner movable core 55 and the fixed core 40 becomes a predetermined value Psi. At this time, the inner movable core 55 moves in the valve-opening direction together with the inner valve member 25. The seal portion 252 separates from the end surface 244.

Here, the predetermined value Psi is a total of the urging force of the first spring 71 and a force in the valve-closing direction that acts on the inner movable core 55 and the inner valve member 25. The force in the valve-closing direction is based on the pressure of the fuel gas within the first cylinder portion 21. When the seal portion 252 separates from the end surface 244, the inner injection hole 241 is opened. The fuel gas inside the first cylinder 21 is injected from the inner injection hole 241.

As shown in FIG. 25, the inner movable core 55 and the inner valve member 25 move in the valve-opening direction until the inner movable core 55 comes into contact with the shock absorbing member 42 (lift amount L11 at time t53 in FIG. 24).

When the inner movable core 55 moves in the valve-opening direction together with the inner valve member 25, the distance between the inner movable core 55 and the fixed core 40 decreases. As a result, as shown in FIG. 24, the magnetic attractive force Ps between the inner movable core 55 and the fixed core 40 increases at a rate of increase that is greater than a rate of increase of the current value I and a rate of increase of the lift amount Mv of the inner valve member 25 (from time t52 to time t53 in FIG. 24).

After the inner movable core 55 comes into contact with the shock absorbing member 42 at time t53, when the current value of the current that flows through the coil 45 is further increased, the magnetic attractive force between the outer movable core 65 and the fixed core 40 becomes a predetermined value Pso at time t54. Here, the predetermined value Pso is a total of the urging force of the second spring 72 and a force in the valve-closing direction that acts on the outer movable core 65 and the outer valve member 35. The force in the valve-closing direction is based on the pressure of the fuel gas within the first cylinder portion 21.

When the magnetic attractive force between the outer movable core 65 and the fixed core 40 reaches the predetermined value Pso, the outer movable core 65 moves in the valve-opening direction together with the outer valve member 35. The seal portion 352 separates from the end surface 244. When the seal portion 352 separates from the end surface 244, the outer injection holes 242 and 243 are opened. The fuel gas inside the first cylinder portion 21 is injected from the outer injection holes 242 and 243.

As shown in FIG. 26, the outer movable core 65 and the outer valve member 35 move in the valve-opening direction until the outer movable core 65 comes into contact with the end surface 401 of the fixed core 40 (lift amount L12 at time t55 in FIG. 24).

When the outer movable core 65 moves in the valve-opening direction together with the outer valve member 35, the distance between the outer movable core 65 and the fixed core 40 decreases. As a result, the magnetic circuit on the path R65 is more easily formed. Therefore, the magnetic attractive force Ps in the magnetic circuit on the path R55 decreases (dotted line Lp11 from time t54 to time t55 in FIG. 24).

When the outer movable core 65 comes into contact with the end surface 401 of the fixed core 40 at time t55, the control unit 70 changes the current value to a current value Am52 that is less than a maximum current value Am51 in the control shown in FIG. 24 (from time t55 to time t57 in FIG. 24). As a result, the magnetic attractive force between the inner movable core 55 and the fixed core 40 and the magnetic attractive force between the outer movable core 65 and the fixed core 40 both decrease.

When the magnetic attractive force between the inner movable core 55 and the fixed core 40 becomes less than the predetermined value Psi during the period from time t55 to time t57, the inner movable core 55 separates from the fixed core 40 and moves in the valve-closing direction, together with the inner valve member 25 (time t56 in FIG. 24). When the inner movable core 55 moves in the valve-closing direction, the seal portion 252 comes into contact with the end surface 244 at time t58.

At this time, the magnetic attractive force between the outer movable core 65 and the fixed core 40 is greater than the predetermined value Pso. Therefore, the outer movable core 65 remains in contact with the end surface 401 of the fixed core 40. That is, the current value Am52 is a current value at which the magnetic attractive force between the inner movable core 55 and the fixed core 40 becomes less than the predetermined value Psi, and a current value at which the magnetic attractive force between the outer movable core 65 and the fixed core 40 becomes greater than the predetermined value Pso.

As a result, as shown in FIG. 27, the fuel injection valve 8 is in a state in which the inner injection hole 241 is closed and the outer injection holes 242 and 243 are open.

Figure 28:
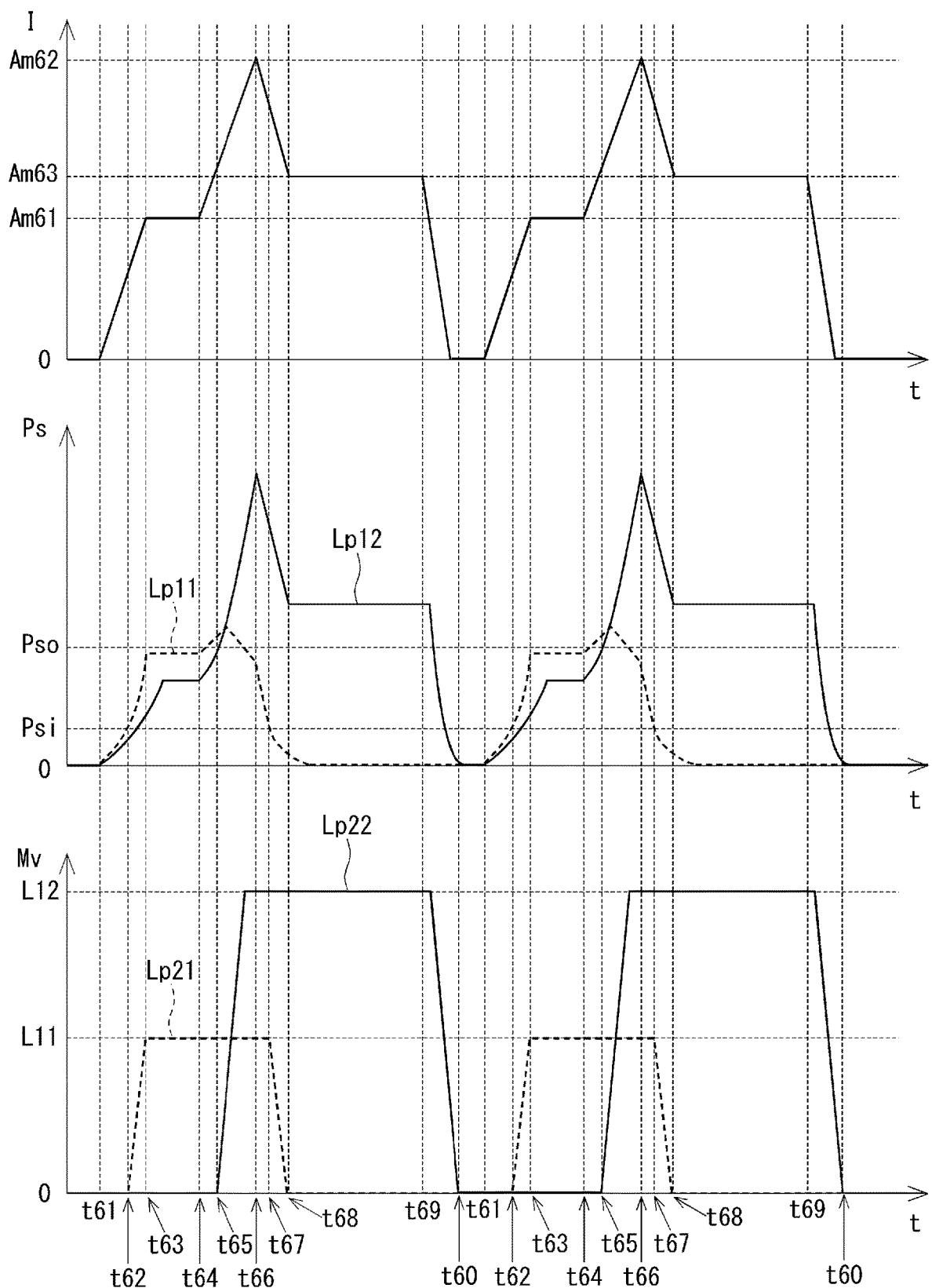
FIG. 28 is a characteristics diagram of changes over time in the characteristics of the valve apparatus according to the eighth embodiment, during control differing from that in FIG. 24.

Next, injection control of fuel gas performed by the control unit 70 that differs from that in FIG. 24 will be described with reference to FIG. 28. In a manner similar to FIG. 24, FIG. 28 shows changes over time in the current value I, magnetic attractive force Ps between the movable cores and the fixed core 40, and lift amount My of the valve members. FIG. 28 is a characteristics diagram of when opening and closing of the inner injection hole 241 and opening and closing of the outer injection holes 242 and 243 are each performed twice.

As shown in FIG. 28, the control unit 70 starts energization of the coil 45 at time t61. When the magnetic attractive force between the inner movable core 55 and the fixed core 40 becomes the predetermined value Psi at time t62, the inner movable core 55 moves in the valve-opening direction together with the inner valve member 25. Therefore, the inner injection hole 241 is opened. Subsequently, at time t63, the lift amount of the inner valve member 25 becomes the lift amount L11. In the control shown in FIG. 28, during the period from time t63 to time t64, the control unit 70 maintains the current value at a current value Am61 to maintain the lift amount of the inner valve member 25 at the lift amount L11.

When the current value of the current flowing through the coil 45 is increased at time t64, the magnetic attractive force between the outer movable core 65 and the fixed core 40 becomes the predetermined value Pso at time t65. As a result, the outer movable core 65 moves in the valve-opening direction together with the outer valve member 35. Therefore, the outer injection holes 242 and 243 are opened.

After the lift amount of the outer valve member 35 becomes the lift amount L12, the control unit 70 changes the current value to a current value Am63 that is less than a maximum current value Am62 in the control shown in FIG. 28 (from time t66 to time t68 in FIG. 28).

Here, the current value Am63 is a current value at which the magnetic attractive force between the inner movable core 55 and the fixed core 40 is less than the predetermined value Psi, and a current value at which the magnetic attractive force between the outer movable core 65 and the fixed core 40 is greater than the predetermined value Pso. As a result, the inner movable core 55 separates from the fixed core 40 at time t67. Therefore, the fuel injection valve 8 is in a state in which the inner injection hole 241 is closed and the outer injection holes 242 and 243 are open.

At time t69 after time t68, the control unit 70 gradually reduces the current value. As a result, as shown in FIG. 28, the magnetic attractive force between the outer movable core 65 and the fixed core 40 becomes less than the predetermined value Pso. Therefore, the outer movable core 65 separates from the end surface 401 of the fixed core 40 and moves in the valve-closing direction.

When the outer movable core 65 moves in the valve-closing direction, the seal portion 352 comes into contact with the end surface 244. Therefore, the outer injection holes 242 and 243 are closed (time t60 in FIG. 28). In the control shown in FIG. 28, after time t60, the control unit 70 repeats the operations from time t61 to time t69, described above. The control unit 70 repeatedly performs opening of the inner injection hole 241, opening of the outer injection holes 242 and 243, closing of the inner injection hole 241, closing of the outer injection holes 242 and 243, and therefore closing of all injection holes, in this order.

Next, injection control of fuel gas performed by the control unit 70 that differs from those in FIG. 24 and FIG. 28 will be described with reference to FIG. 29. In a manner similar to FIG. 24 and FIG. 28, FIG. 29 shows changes over time in the current value I, magnetic attractive force Ps between the movable cores and the fixed core 40, and lift amount My of the valve members.

Figure 29:
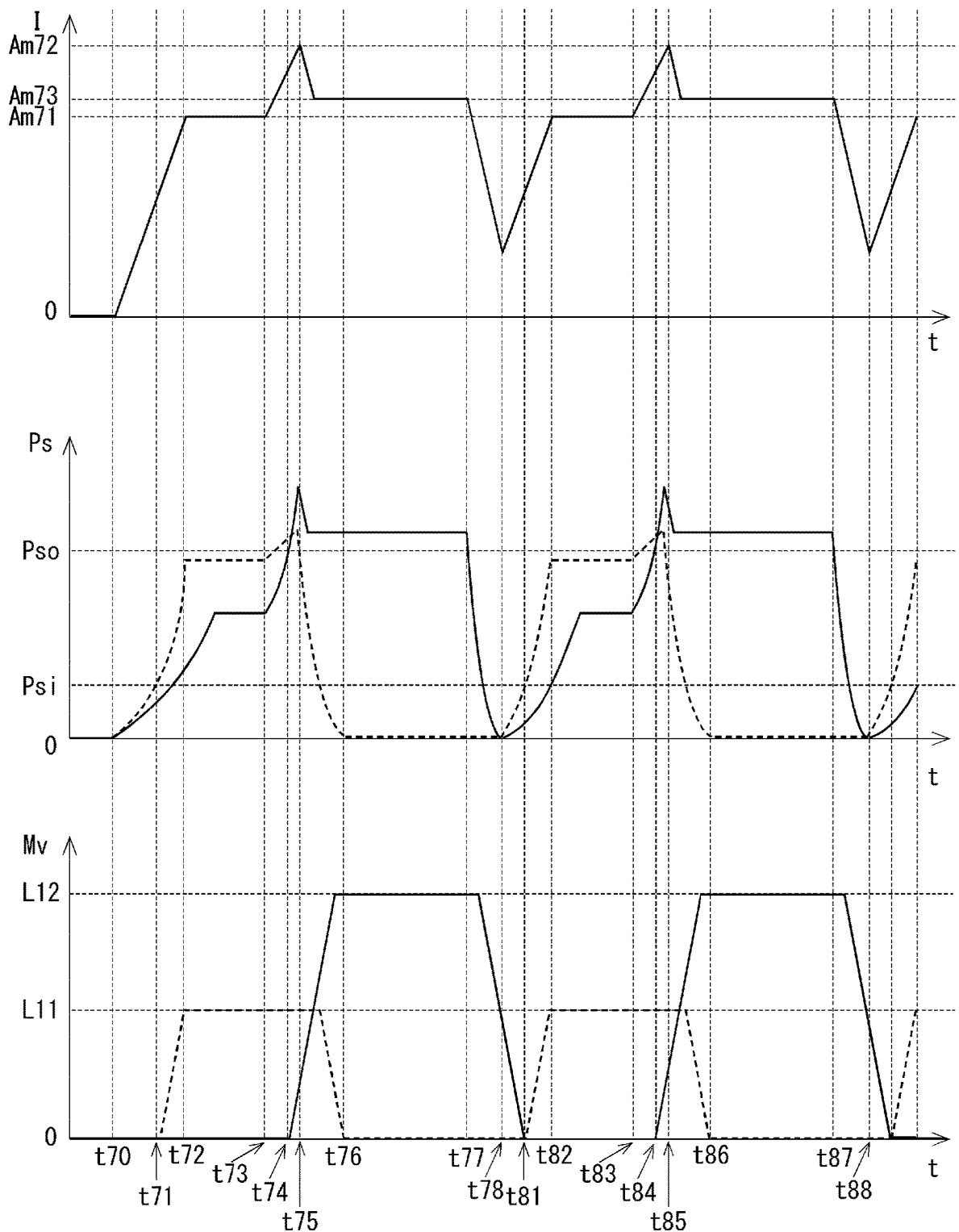
FIG. 29 is a characteristics diagram of changes over time in the characteristics of the valve apparatus according to the eighth embodiment, during control differing from those in FIG. 24 and FIG. 28.

As shown in FIG. 29, the control unit 70 starts energization of the coil 45 at time t70. When the magnetic attractive force between the inner movable core 55 and the fixed core 40 becomes the predetermined value Psi at time t71, the inner movable core 55 moves in the valve-opening direction together with the inner valve member 25. The inner injection hole 241 is opened.

Subsequently, at time t72, the lift amount of the inner valve member 25 becomes the lift amount L11. In the control shown in FIG. 29, during the period from time t72 to time t73, the control unit 70 maintains the current value at a current value Am71 to maintain the lift amount of the inner valve member 25 at the lift amount L11.

When the current value of the current that flows through the coil 45 is increased at time t73, the magnetic attractive force between the outer movable core 65 and the fixed core 40 becomes the predetermined value Pso at time t74. As a result, the outer movable core 65 moves in the valve-opening direction together with the outer valve member 35. The outer injection holes 242 and 243 are opened.

After the lift amount of the outer valve member 35 becomes the lift amount L12, the control unit 70 changes the current value to a current value Am73 that is less than a maximum current value Am72 (time t75 in FIG. 29) in the control shown in FIG. 27.

Here, the current value Am73 is a current value at which the magnetic attractive force between the inner movable core 55 and the fixed core 40 is less than the predetermined value Psi, and a current value at which the magnetic attractive force between the outer movable core 65 and the fixed core 40 is greater than the predetermined value Pso. Therefore, at time t76, the fuel injection valve 8 maintains a state in which the inner injection hole 241 is closed and the outer injection holes 242 and 243 are open.

At time t77 after time t76, the control unit 70 gradually reduces the current value. As a result, as shown in FIG. 29, the magnetic attractive force between the outer movable core 65 and the fixed core 40 becomes less than the predetermined value Pso. Therefore, the outer movable core 65 moves in the valve-closing direction. At this time, at time t78 after time t77, the control unit 70 increases the current value again. As a result, the magnetic attractive force between the inner movable core 55 and the fixed core 40 increases.

When the outer movable core 65 moves in the valve-closing direction, the seal portion 352 comes into contact with the end surface 244. Therefore, the outer injection holes 242 and 243 are closed (time t81 in FIG. 29). At this time, in the control shown in FIG. 29, the magnetic attractive force between the inner movable core 55 and the fixed core 40 become the predetermined value Psi. Therefore, the inner movable core 55 moves in the valve-opening direction together with the inner valve member 25. The inner injection hole 241 is opened.

After time t81, from time t82 to time t88, the control unit 70 performs the same control as that from time t72 to time t78, described above. As a result, in the control shown in FIG. 29, the control unit 70 alternately opens the inner injection hole 241, and the outer injection holes 242 and 243. The control unit 70 maintains a state in which at least either of the inner injection hole 241 and the outer injection holes 242 and 243 is opened.

In the fuel injection valve 8 according to the eighth embodiment, in the state in which the inner injection hole 241 and the outer injection holes 242 and 243 are open, the control unit 70 sends a current that has a current value at which the magnetic attractive force between the inner movable core 55 and the fixed core 40 is less than the predetermined value Psi, and the magnetic attractive force between the outer movable core 65 and the fixed core 40 is greater than the predetermined value Pso.

As a result, in the fuel injection valve 8, the fuel gas can be injected in a state in which only the outer injection holes 242 and 243 are open, in addition to the state in which only the inner injection hole 241 is open and the state in which the inner injection hole 241 and the outer injection holes 242 and 243 are open. Therefore, according to the eighth embodiment, the injection of fuel gas can be performed in more stages than that according to the first embodiment.

In addition, in the fuel injection valve 8, the inner injection hole 241 and the outer injection holes 242 and 243 can be alternately opened, as in the control shown in FIG. 27. In the fuel injection valve 8, the injection amount of fuel gas from the inner injection hole 241 differs from the injection amount of fuel gas from the outer injection holes 242 and 243. Therefore, the pressure pulsation of fuel gas during injection of fuel gas changes with relative significance. Consequently, the fuel injection valve 8 can change the pressure pulsation based on the combustion state in the combustion chamber 110 of the engine 11.

Ninth Embodiment

Figure 30:
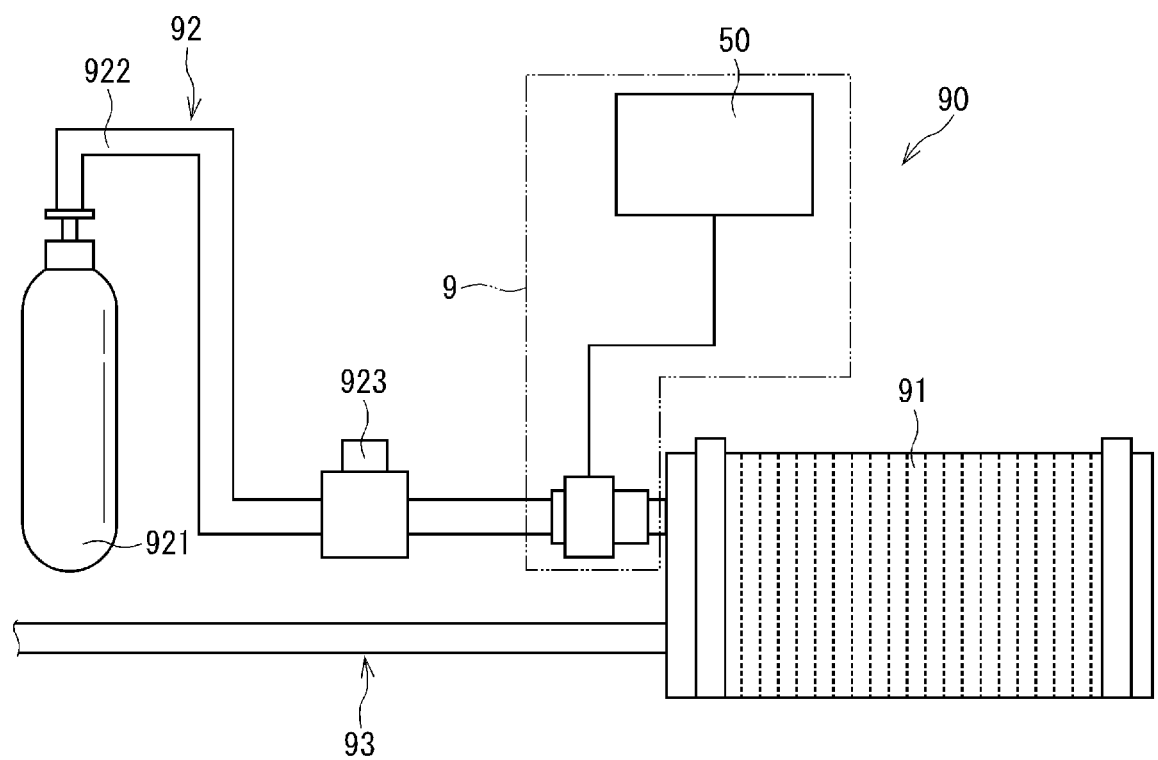
FIG. 30 is a schematic diagram of a fuel cell system to which a valve apparatus according to a ninth embodiment is applied.

Next, a valve apparatus according to a ninth embodiment will be described with reference to FIG. 30. The ninth embodiment differs from the first embodiment in terms of the system to which the valve apparatus is applied.

A valve apparatus 9 according to the ninth embodiment will be described with reference to FIG. 30. The valve apparatus 9 is applied to a fuel cell system 90 shown in FIG. 30.

The fuel cell system 90 includes a fuel cell 91, a fuel gas flow system 92, an oxidant gas flow system 93, and the like. The fuel cell system 90 generates electrical energy using electrochemical reaction between hydrogen and oxygen. Hydrogen serves as a fuel gas. Oxygen serves as an oxidant gas.

For example, the fuel cell 91 is a solid polymer electrolyte fuel cell. The fuel cell 91 includes a plurality of cells, electrodes, a hydrogen supply pipe, an air supply pipe, and the like. The plurality of cells are stacked together. The electrodes are provided on both ends in a stacking direction of the plurality of cells.

Each cell has an electrolyte membrane, a multielectrode array (MEA), and a pair of separators. The MEA has electrodes that are provided on both side surfaces of the electrolyte membrane. The pair of separators sandwich the MEA. The cell is formed so as to allow hydrogen and air to flow through, while isolating the hydrogen and the air from each other. The cell generates a potential difference between an anode and a cathode of the pair of separators, that is, electrical energy by a reaction between the hydrogen supplied by the hydrogen supply pipe and the oxygen contained in the air supplied by the air supply pipe.

The fuel gas flow system 92 includes a hydrogen tank 921, a hydrogen pipe 922, a regulator 923, and the like. The hydrogen tank 921 stores, under high pressure, hydrogen that is supplied to the fuel cell 91. The hydrogen pipe 922 connects the hydrogen tank 921 and the hydrogen supply pipe of the fuel cell 91. The hydrogen pipe 922 has a flow path through which the hydrogen flows. The regulator 923 is provided in the hydrogen pipe 922. The regulator 923 adjusts the pressure of hydrogen flowing through the hydrogen pipe 922.

The valve apparatus 9 is provided between the regulator 923 in the hydrogen pipe 922 and the fuel cell 91. The valve apparatus 9 adjusts a supply amount of hydrogen that is supplied to the fuel cell 91.

The oxidant gas flow system 93 is a pipe through which air can flow. The oxidant gas flow system 93 connects the atmosphere and the air supply pipe of the fuel cell 91. The oxidant gas flow system 93 supplies atmospheric air to the fuel cell 91.

In the valve apparatus 9 according to the ninth embodiment, the supply amount of hydrogen that flows through the hydrogen pipe 922 is adjusted. At this time, in the valve apparatus 9, the supply amount of hydrogen required by the fuel cell 91 can be covered over a wide range as a result of the opening and closing of the inner injection hole 241 and the outer injection holes 242 and 243 being controlled. Consequently, according to the ninth embodiment, the effects (a) to (d), (f), and (g) according to the first embodiment can be obtained.

In addition, in the valve apparatus 9 according to the ninth embodiment, a relatively large pressure pulsation can be generated in the flow of hydrogen as a result of the control unit 50 controlling the current value and the pulse width of the current sent to the coil 45. As a result, water that is produced by the electrochemical reaction between hydrogen and oxygen in the fuel cell 91 can be discharged from the fuel cell 91 by the pressure pulsation. Consequently, reduced output of the fuel cell 91 can be prevented.

Other Embodiments

According to the first to eighth embodiments, the valve apparatus is a fuel injection valve that injects fuel gas. In addition, according to the ninth embodiment, the valve apparatus is a valve apparatus that injects hydrogen gas. However, the fluid need not be a fuel gas. The fluid may be a liquid fuel or other types of fluids.

According to the above-described embodiments, the magnetic constriction portion of which the magnetic flux density becomes saturated is provided in the fixed core. However, the magnetic constriction portion may be provided on the valve-opening direction side of the inner movable core.

According to the above-described embodiments, the area of the magnetic constriction portion that opposes the inner movable core is smaller than the area of the fixed core that opposes the outer movable core. In addition, the distance between the inner movable core and the end surface of the magnetic constriction portion on the valve-closing direction side is shorter than the distance between the outer movable core and the end surface of the fixed core on the valve-closing direction side. However, the relationship regarding areas and distances is not limited thereto.

The relationship may be such that only the area of the magnetic constriction portion that opposes the inner movable core is smaller than the area of the fixed core that opposes the outer movable core. Alternatively, the relationship may be such that only the distance between the inner movable core and the end surface of the magnetic constriction portion on the valve-closing direction side is shorter than the distance between the outer movable core and the end surface of the fixed core on the valve-closing direction side.

According to the above-described embodiments, by controlling the magnitude of the current, the control unit selectively perform (i) injection from only the inner injection hole, (ii) continuous injection from the inner injection hole and the outer injection holes, (iii) intermittent injection from the outer injection holes while continuous injection from the inner injection hole is performed, and (iv) continuous injection from only the outer injection holes. However, the control unit may merely perform continuous injection from the inner injection hole and the outer injection holes by simply sending a current to the coil.

The control shown in FIG. 29 according to the eighth embodiment may be applied to the fuel cell system according to the ninth embodiment. In this case, because moisture that accumulates inside the fuel cell can be removed by changes in pressure of the hydrogen, reduced performance caused by moisture in the fuel cell system can be prevented.

According to the above-described embodiments, the fuel injection valve includes the inner injection hole that is positioned on the center axis, and the outer injection holes that are formed in directions away from the center axis when viewed from the inner injection hole. However, the arrangement of the injection holes is not limited thereto. All that is required is that the opening and closing of a plurality of injection holes be controlled by independent movement of a plurality of valve members. In addition, movement of the plurality of valve members need not be coaxial.

According to the above-described embodiments, the inner injection hole is formed such that the cross-sectional area thereof is smaller than the total cross-sectional area of the outer injection holes. However, the relationship between the cross-sectional areas of the injection holes is not limited thereto.

According to the sixth embodiment, the outer movable core is provided with the sliding member. However, the member that is provided with the sliding member is not limited thereto. The sliding member may be provided in the outer valve member that is made of a magnetic material.

According to the above-described embodiments, the seal portion of the valve member is made of rubber. However, the seal member may be made of a resin.

According to the above-described embodiments, the control unit controls the magnitude of the current that is supplied to the coil. However, the control unit may control a voltage that is applied to the coil.

According to the above-described embodiments, soft nitriding treatment is performed on the side surface of the outer movable core on the inner side in the radial direction and the side surface of the inner movable core on the outer side in the radial direction. The treatment may be performed by the side surfaces being coated with DLC (diamond-like carbon). Alternatively, the side surfaces may be coated with fluororesin.

The present disclosure is not limited to the embodiments described above. Various embodiments are possible without departing from the spirit of the present disclosure.

What is claimed is:

1. A valve apparatus comprising:
a housing that includes a plurality of through holes through which a fluid flows from the valve apparatus;
a first valve member that is provided so as to move relative to the housing, and opens and closes a first through hole that is at least one or more of the plurality of through holes;
a second valve member that is provided so as to move relative to the housing, and opens and closes at least one second through hole of the plurality of through holes excluding the first through hole;
a fixed core that is provided in such a manner that the fixed core does not move relative to the housing;
a coil that forms a magnetic field by being energized;
a control unit that controls energization of the coil;
a first movable core that is provided so as to move integrally with the first valve member, and in which a magnetic attractive force is generated between the first movable core and the fixed core when the coil forms the magnetic field;
a second movable core that is provided so as to move integrally with the second valve member, and in which a magnetic attractive force is generated between the second movable core and the fixed core when the coil forms the magnetic field; and
a magnetic constriction portion that is provided between the fixed core and the first movable core, wherein:
the coil, the first valve member and the second valve member are configured such that energization of the coil causes movement of the first and second valve members from closed positions to open positions;
the control unit is configured to control the energization of the coil such that the second through hole is opened by movement of the second valve member after the first through hole is opened by movement of the first valve member;
the second through hole is provided in a position that is radially outside of the periphery of the first through hole; and
the second valve member is a cylindrical member that is provided in an outer radial direction from the first valve member.

2. The valve apparatus according to claim 1, wherein:
the magnetic constriction portion is provided in such a manner that the magnetic constriction portion does not move relative to the fixed core; and
the magnetic constriction portion is formed so as to meet at least either of conditions, the conditions being that: (i) an area of an end surface that opposes the first movable core is smaller than an area of an end surface of the fixed core that opposes the second movable core; and (ii) a distance between the magnetic constriction portion and the first movable core is shorter than a distance between the second movable core and the end surface of the fixed core that opposes the second movable core.

3. The valve apparatus according to claim 2, further comprising:
a non-magnetic portion that is provided between the fixed core and the first movable core.

4. The valve apparatus according to claim 2, wherein:
the first valve member and the second valve member are formed so as to move coaxially.

5. The valve apparatus according to claim 2, wherein:
a cross-sectional area of the first through hole is smaller than a cross-sectional area of the second through hole.

6. The valve apparatus according to claim 2, further comprising:
an urging member that is provided between the first valve member and the second valve member, and urges the second valve member in a direction away from the second through hole when the first valve member opens the first through hole.

7. The valve apparatus according to claim 1, further comprising:
a non-magnetic portion that is provided between the fixed core and the first movable core.

8. The valve apparatus according to claim 1, wherein:
the first valve member and the second valve member are formed so as to move coaxially.

9. The valve apparatus according to claim 1, wherein:
a cross-sectional area of the first through hole is smaller than a cross-sectional area of the second through hole.

10. The valve apparatus according to claim 1, further comprising:
an urging member that is provided between the first valve member and the second valve member, and urges the second valve member in a direction away from the second through hole when the first valve member opens the first through hole.

11. The valve apparatus according to claim 1, further comprising:
an elastic member that is provided in either of the first valve member and the second valve member, and engages with the other of the first valve member and the second valve member.

12. The valve apparatus according to claim 1, further comprising:
a non-magnetic member that is provided between the fixed core and the first movable core, wherein
the first valve member is such that an end portion on the through-hole side slides over a through-hole forming portion of the housing in which the through holes are formed, and an end portion on a side opposite the through-hole side slides over the non-magnetic portion, and
the first valve member and the through-hole forming portion are made of a non-magnetic material.

13. The valve apparatus according to claim 12, wherein:
the second valve member and the second movable core are positioned in an outer radial direction from the first valve member;
the valve apparatus further includes a sliding member that is made of a non-magnetic material, is provided on an inner side in the radial direction of the second valve member and the second movable core comprising a portion that is made of a magnetic material, and slides over the first valve member, which is made of a non-magnetic material; and
relative movement of the second valve member and the second movable core in relation to the housing is guided by only the first valve member.

14. The valve apparatus according to claim 13, wherein a distance between a side surface of the second valve member on an outer side in the radial direction of the second valve member or a side surface of the second movable core on an outer side in a radial direction of the second movable core and an inner wall surface of the housing that opposes the side surface of the second valve member or the side surface of the second movable core is greater than a distance between a side surface of the sliding member on an inner side in a radial direction of the sliding member and a side surface of the first valve member on an outer side in a radial direction of the first valve member that opposes the side surface of the sliding member.

15. The valve apparatus according to claim 1, wherein:
the control unit controls energization of the coil such that the second through hole is intermittently opened in a state in which the first through hole is continuously open.

16. A valve apparatus comprising:
a housing that includes a plurality of through holes through which a fluid flows from the valve apparatus;
a first valve member that is provided so as to move relative to the housing, and opens and closes a first through hole that is at least one or more of the plurality of through holes;
a second valve member that is provided so as to move relative to the housing, and opens and closes at least one second through hole of the plurality of through holes excluding the first through hole;
a fixed core that is provided in such a manner that the fixed core does not move relative to the housing;
a coil that forms a magnetic field by being energized;
a control unit that controls energization of the coil;
a first movable core that is provided so as to move integrally with the first valve member, and in which a magnetic attractive force is generated between the first movable core and the fixed core when the coil forms the magnetic field;
a second movable core that is provided so as to move integrally with the second valve member, and in which a magnetic attractive force is generated between the second movable core and the fixed core when the coil forms the magnetic field; and
a magnetic constriction portion that is provided between the fixed core and the first movable core, wherein:
the coil, the first valve member and the second valve member are configured such that energization of the coil causes movement of the first and second valve members from closed positions to open positions;
the control unit is configured to control the energization of the coil such that the second through hole is opened by movement of the second valve member after the first through hole is opened by movement of the first valve member; and
the control unit controls energization of the coil such that, after the second through hole is opened after the first through hole is opened, the first through hole is closed while the second through hole remains open.

17. The valve apparatus according to claim 16, wherein:
the control unit controls energization of the coil such that, after the second through hole is opened after the first through hole is opened, the second through hole is closed after the first through hole is closed.

18. The valve apparatus according to claim 17, wherein:
the control unit controls energization of the coil such that opening and closing of the first through hole and the second through hole that, after the second through hole is opened after the first through hole is opened, the second through hole is closed after the first through hole is closed is repeatedly performed.

19. A valve apparatus comprising:
a housing that includes a plurality of through holes through which a fluid flows from the valve apparatus;
a first valve member that is provided so as to move relative to the housing, and opens and closes a first through hole that is at least one or more of the plurality of through holes;
a second valve member that is provided so as to move relative to the housing, and opens and closes at least one second through hole of the plurality of through holes excluding the first through hole;

a fixed core that is provided in such a manner that the fixed core does not move relative to the housing;
a coil that forms a magnetic field by being energized;
a control unit that controls energization of the coil;
a first movable core that is provided so as to move integrally with the first valve member, and in which a magnetic attractive force is generated between the first movable core and the fixed core when the coil forms the magnetic field;
a second movable core that is provided so as to move integrally with the second valve member, and in which a magnetic attractive force is generated between the second movable core and the fixed core when the coil forms the magnetic field; and
a magnetic constriction portion that is provided between the fixed core and the first movable core, wherein:
the coil, the first valve member and the second valve member are configured such that energization of the coil causes movement of the first and second valve members from closed positions to open positions;
the control unit is configured to control the energization of the coil such that the second through hole is opened by movement of the second valve member after the first through hole is opened by movement of the first valve member; and
the first valve member is located within the second valve member.

20. A valve apparatus comprising:
a housing that includes a plurality of through holes through which a fluid flows from the valve apparatus;
a first valve member that is provided so as to move relative to the housing, and opens and closes a first through hole that is at least one or more of the plurality of through holes;
a second valve member that is provided so as to move relative to the housing, and opens and closes at least one second through hole of the plurality of through holes excluding the first through hole;
a fixed core that is provided in such a manner that the fixed core does not move relative to the housing;
a coil that forms a magnetic field by being energized;
a control unit that controls energization of the coil;
a first movable core that is provided so as to move integrally with the first valve member, and in which a magnetic attractive force is generated between the first movable core and the fixed core when the coil forms the magnetic field;
a second movable core that is provided so as to move integrally with the second valve member, and in which a magnetic attractive force is generated between the second movable core and the fixed core when the coil forms the magnetic field; and
a magnetic constriction portion that is provided between the fixed core and the first movable core, wherein:
the coil, the first valve member and the second valve member are configured such that energization of the coil causes movement of the first and second valve members from closed positions to open positions;
the control unit is configured to control the energization of the coil such that the second through hole is opened by movement of the second valve member after the first through hole is opened by movement of the first valve member; and
the first valve member and the second valve member move from the closed positions to the open positions in a same direction.

21. A valve apparatus comprising:
a housing that includes a plurality of through holes through which a fluid flows from the valve apparatus;
a first valve member that is provided so as to move relative to the housing, and opens and closes a first through hole that is at least one or more of the plurality of through holes;
a second valve member that is provided so as to move relative to the housing, and opens and closes at least one second through hole of the plurality of through holes excluding the first through hole;
a fixed core that is provided in such a manner that the fixed core does not move relative to the housing;
a coil that forms a magnetic field by being energized;
a control unit that controls energization of the coil;
a first movable core that is provided so as to move integrally with the first valve member, and in which a magnetic attractive force is generated between the first movable core and the fixed core when the coil forms the magnetic field;
a second movable core that is provided so as to move integrally with the second valve member, and in which a magnetic attractive force is generated between the second movable core and the fixed core when the coil forms the magnetic field; and
a magnetic constriction portion that is provided between the fixed core and the first movable core, wherein:
the coil, the first valve member and the second valve member are configured such that energization of the coil causes movement of the first and second valve members from closed positions to open positions;
the control unit is configured to control the energization of the coil such that the second through hole is opened by movement of the second valve member after the first through hole is opened by movement of the first valve member; and
the at least one second through hole comprises two or more through holes that circumferentially surround the first through hole.

* * * * *